US008803878B2

(12) United States Patent
Andersen et al.

(10) Patent No.: US 8,803,878 B2
(45) Date of Patent: Aug. 12, 2014

(54) VISUALIZING REGION GROWING IN THREE DIMENSIONAL VOXEL VOLUMES

(75) Inventors: Jahn Otto Næsgaard Andersen, Oppegård (NO); Randolph E. F. Pepper, Beijing (CN); Bjarte Dysvik, Hafrsfjord (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 545 days.

(21) Appl. No.: 12/405,771

(22) Filed: Mar. 17, 2009

(65) Prior Publication Data

US 2010/0171740 A1 Jul. 8, 2010

Related U.S. Application Data

(60) Provisional application No. 61/040,595, filed on Mar. 28, 2008.

(51) Int. Cl.
*G06T 17/00* (2006.01)
(52) U.S. Cl.
USPC ............................ 345/424; 382/173; 715/848
(58) Field of Classification Search
CPC ........... G06T 7/0089; G01V 2210/641; G01V 2210/74
USPC ............................ 345/424; 382/173; 715/848
See application file for complete search history.

(56) References Cited

U.S. PATENT DOCUMENTS

| 5,873,051 A | 2/1999 | Van Bemmel et al. |
| 5,992,519 A | 11/1999 | Ramakrishnan et al. |
| 6,278,949 B1 | 8/2001 | Alam |
| 6,302,204 B1 | 10/2001 | Reimers et al. |
| 6,304,266 B1 | 10/2001 | Li |
| 6,313,837 B1 | 11/2001 | Assa et al. |
| 6,690,820 B2 | 2/2004 | Lees et al. |
| 6,823,266 B2 | 11/2004 | Czernuszenko et al. |
| 6,941,255 B2 | 9/2005 | Kennon et al. |
| 6,950,786 B1 | 9/2005 | Sonneland et al. |

(Continued)

FOREIGN PATENT DOCUMENTS

| EP | 1869640 A1 | 10/2006 |
| WO | 9964896 A1 | 12/1999 |
| WO | 2004/025556 A3 | 3/2004 |
| WO | 2004049216 A1 | 6/2004 |

OTHER PUBLICATIONS

Examination Report from the GCC Patent Office dated Oct. 4, 2011 in the application GCC/P/2008/10483 filed on Apr. 3, 2008 with a priority date of Mar. 29, 2007.

(Continued)

*Primary Examiner* — Kee M Tung
*Assistant Examiner* — Peter Hoang
(74) *Attorney, Agent, or Firm* — Lam Nguyen; Rodney Warfford; Brian Pangrle

(57) ABSTRACT

Visualizing region growing in 3D voxel volumes relates to generating a 3D scene having a plurality of voxels for representing a volume data set of seismic data collected from the oilfield, defining a segmentation algorithm for segmenting the volume data within the 3D scene, the segmentation algorithm comparing a pre-determined threshold to an attribute of a voxel of the plurality of voxels, defining a control parameter associated with the attribute for controlling the segmentation algorithm, adjusting the control parameter to guide the segmentation algorithm in segmenting the volume data set to generate a visualized geobody, and displaying the visualized geobody.

20 Claims, 13 Drawing Sheets

(56) References Cited

U.S. PATENT DOCUMENTS

| | | |
|---|---|---|
| 6,980,940 B1 | 12/2005 | Gurpinar et al. |
| 7,006,085 B1 | 2/2006 | Acosta et al. |
| 7,024,021 B2 | 4/2006 | Dunn et al. |
| 2001/0042642 A1 | 11/2001 | King |
| 2001/0055016 A1 | 12/2001 | Krishnan |
| 2003/0132934 A1 | 7/2003 | Fremming |
| 2003/0216897 A1 | 11/2003 | Endres et al. |
| 2004/0062145 A1 | 4/2004 | Dunn et al. |
| 2004/0220846 A1 | 11/2004 | Cullick et al. |
| 2005/0110791 A1 | 5/2005 | Krishnamoorthy et al. |
| 2005/0140678 A1 * | 6/2005 | Gielis et al. ............ 345/441 |
| 2005/0149307 A1 | 7/2005 | Gurpinar et al. |
| 2006/0151214 A1 | 7/2006 | Prange et al. |
| 2006/0197759 A1 | 9/2006 | Fremming |
| 2006/0279569 A1 * | 12/2006 | Acosta et al. ............ 345/424 |
| 2007/0103464 A1 * | 5/2007 | Kaufman et al. ........... 345/424 |
| 2007/0112547 A1 | 5/2007 | Ghorayeb et al. |
| 2008/0243749 A1 * | 10/2008 | Pepper et al. ............ 706/47 |
| 2010/0171740 A1 | 7/2010 | Andersen et al. |

OTHER PUBLICATIONS

Ariffin, et al., "Seismic Tools for Reservoir Management", Oilfield Review, vol. 7(4), Dec. 1, 1995, pp. 4-17.

Borgos, , "Automated Structural Interpretation Through Classification of Seismic Horizons", Mathematical Methods and Modelling in Hydrocarbon Exploration and Production, Mathematics in Industry vol. 7, Springer Verlag, Berlin/Heidelberg, DE, 2005, pp. 89-106.

Geoframe, The enterprise geoscience solution, Schlumberger Information Solutions, 2008, 1 page.

GeoProbe Volume Interpretation Software, Halliburton, 2008, 5 pages.

Geoviz, Faster, bigger, better 3D interpretation and visualization, Schlumberger Information Solutions, 2008, 1 page.

Henderson, et al., "Automated delineation of geological elements from 3D seismic data through analysis of multichannel, volumetric spectral decomposition data", European Association of Geoscientists and Engineers, First Break vol. 25, Mar. 2007, 7 pages.

Inside Reality, Transforms Collacorative Workflows, Schlumberger Information Solutions, 2008, 2 pages.

Petrel Jan. 2007, What's New, Schlumberger Information Solutions, 2008, 2 pages.

Sonneland, et al., "Automated Geometry Extraction from 3D Seismic Data by Lateral Waveform Recognition", 66th EAGE Conference & Exhibition, Jun. 7, 2004.

VoxelGeo, Volume-Based Seismic Interpretation, 2005, 6 pages.

* cited by examiner

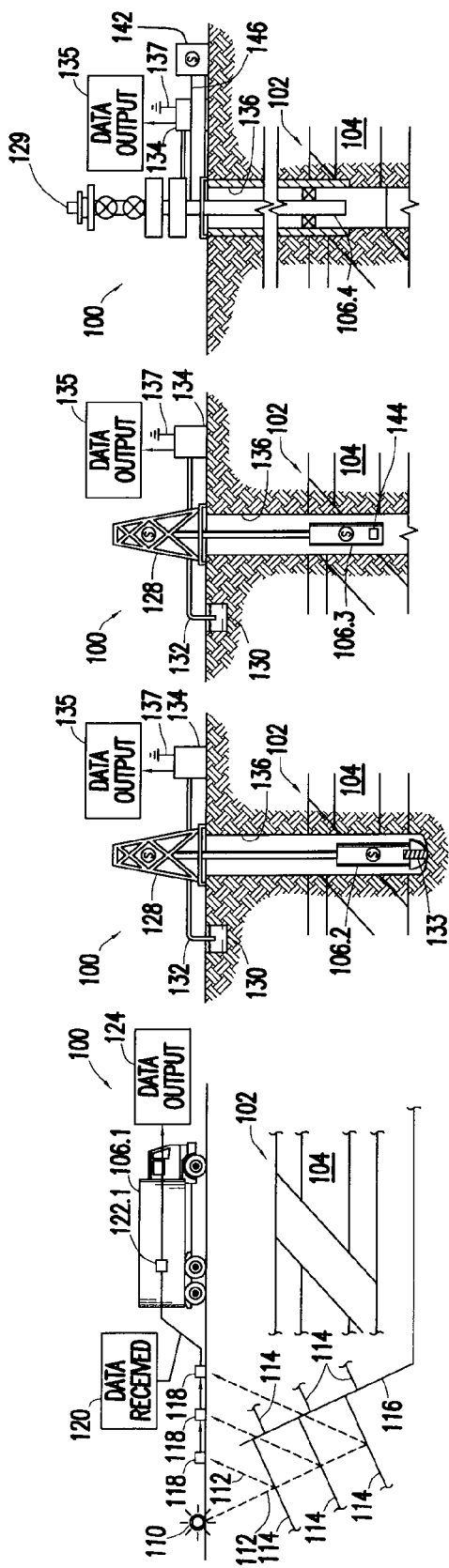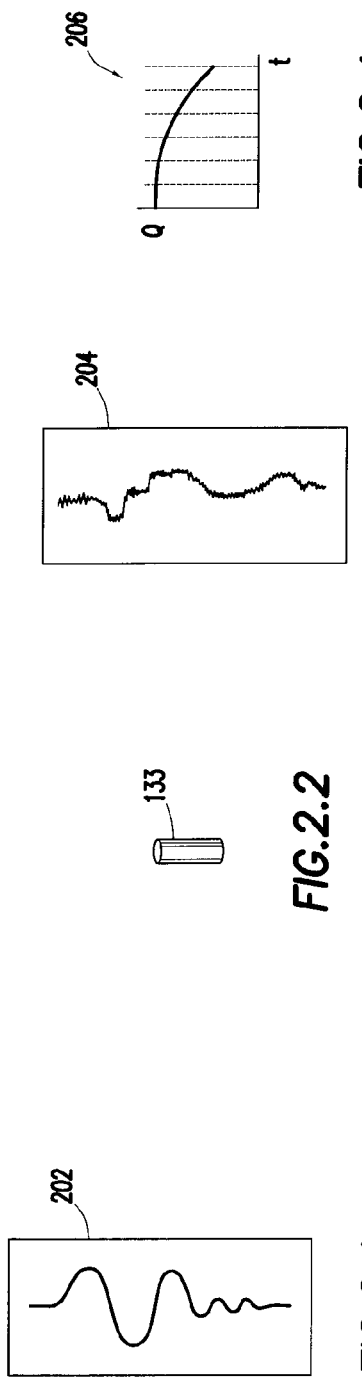

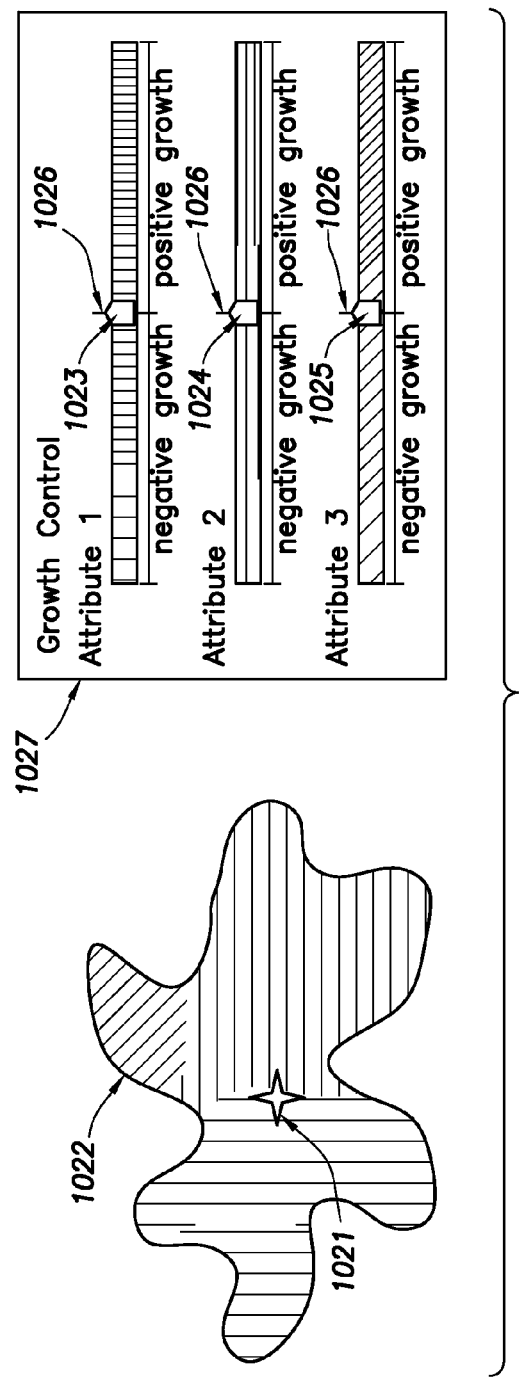
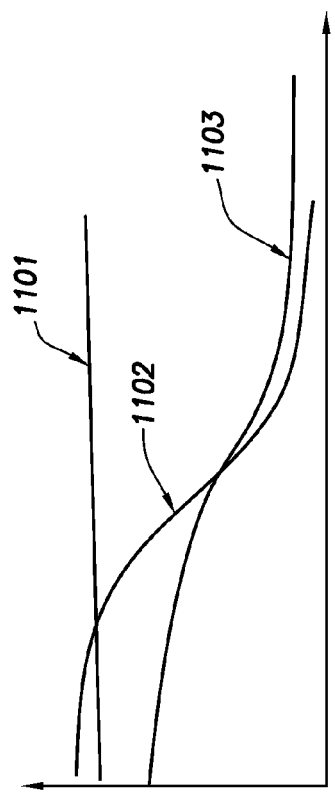
FIG.10.1
FIG.11

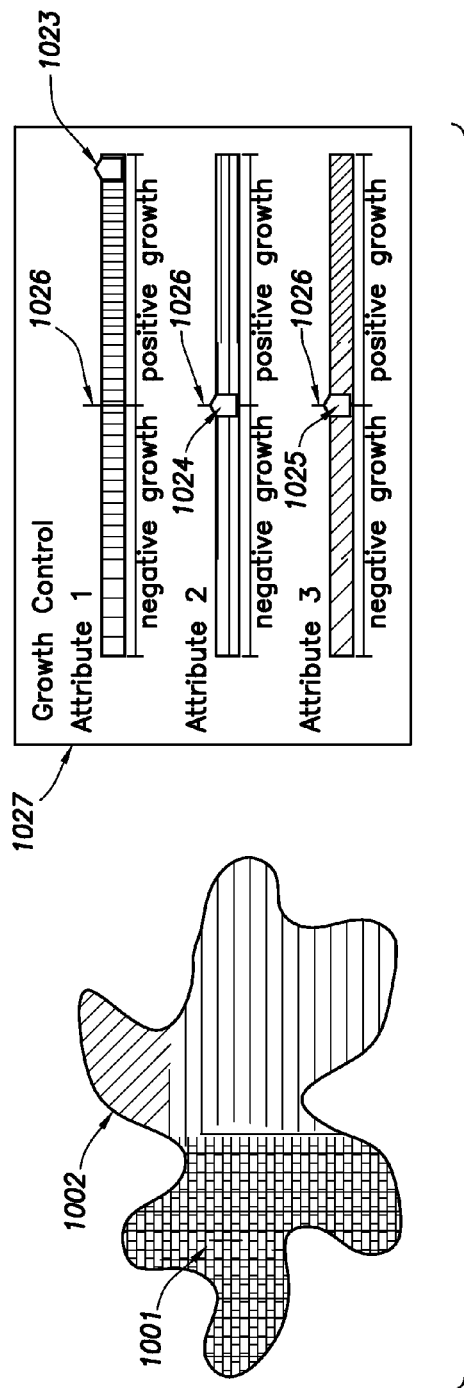
FIG.10.2
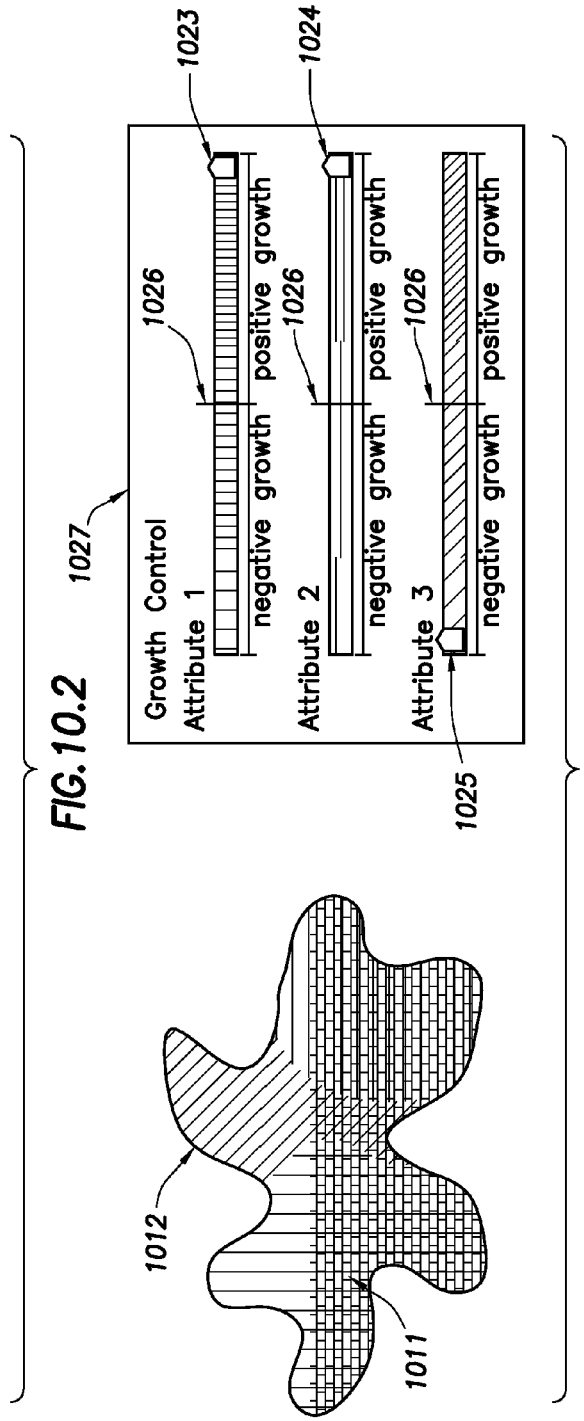
FIG.10.3

VISUALIZING REGION GROWING IN THREE DIMENSIONAL VOXEL VOLUMES

CROSS REFERENCE TO RELATED APPLICATIONS

This application claims priority under 35 U.S.C. §119(e) to Provisional Patent Application No. 61/040,595 filed Mar. 28, 2008, entitled "System and Method for Visualizing Oilfield Data", which is hereby incorporated by reference in its entirety.

BACKGROUND

Oilfield operations, such as surveying, drilling, wireline testing, completions and production, are typically performed to locate and gather valuable downhole fluids. As shown in FIG. 1.1, surveys are often performed using acquisition methodologies, such as seismic scanners to generate maps of underground structures. These structures are often analyzed to determine the presence of subterranean assets, such as valuable fluids or minerals. This information is used to assess the underground structures and locate the formations containing the desired subterranean assets. Data collected from the acquisition methodologies may be evaluated and analyzed to determine whether such valuable items are present, and if they are reasonably accessible.

A seismic volume is a 3D cube of values generated by various data acquisition tools described above. A position in the 3D cube is referred to as a voxel. Horizon interpretation of 3D seismic volumes typically includes of a computer program that auto-tracks a signal consistent event based on user-defined criteria and user provided "seed" points from which to grow the surface of a visualized geobody. The methods available for geobody segmentation are based on one or more seed points. The segmentation starts at the one or more seed points and growing into voxels that are spatially connected with an alpha value (i.e., the rendering opacity value) above a given threshold, or a data range within a pre-defined bound. The above methodology is typically used for geobodies that are easily isolated using a combination of opacity curve and suitable probe shapes. However, in certain scenarios the segmentation may extend into areas that are not a part of the desired geobody. In such scenarios, a trained geophysicist (or other expert) typically manually analyzes information related to the desired geobody and adjusts the manner in which geobody segmentation being is performed for the particular geobody.

SUMMARY

Visualizing region growing in 3D voxel volumes relates to generating a 3D scene having a plurality of voxels for representing a volume data set of seismic data collected from the oilfield, defining a segmentation algorithm for segmenting the volume data within the 3D scene, the segmentation algorithm comparing a pre-determined threshold to an attribute of a voxel of the plurality of voxels, defining a control parameter associated with the attribute for controlling the segmentation algorithm, adjusting the control parameter to guide the segmentation algorithm in segmenting the volume data set to generate a visualized geobody, and displaying the visualized geobody.

Other aspects of the visualizing region growing in 3D voxel volumes will be apparent from the following description and the appended claims.

BRIEF DESCRIPTION OF DRAWINGS

FIGS. 1.1-1.4 depict a schematic view of an oilfield having subterranean structures containing reservoirs therein, various oilfield operations being performed on the oilfield.

FIGS. 2.1-2.4 show graphical depictions of data collected by the tools of FIGS. 1.1-1.4, respectively.

FIGS. 10.1-10.3 show diagrams depicting example segmentation algorithms with control parameters.

FIG. 11 shows a diagram depicting an example segmentation algorithm with time varying control parameters.

DETAILED DESCRIPTION

Figure 3:
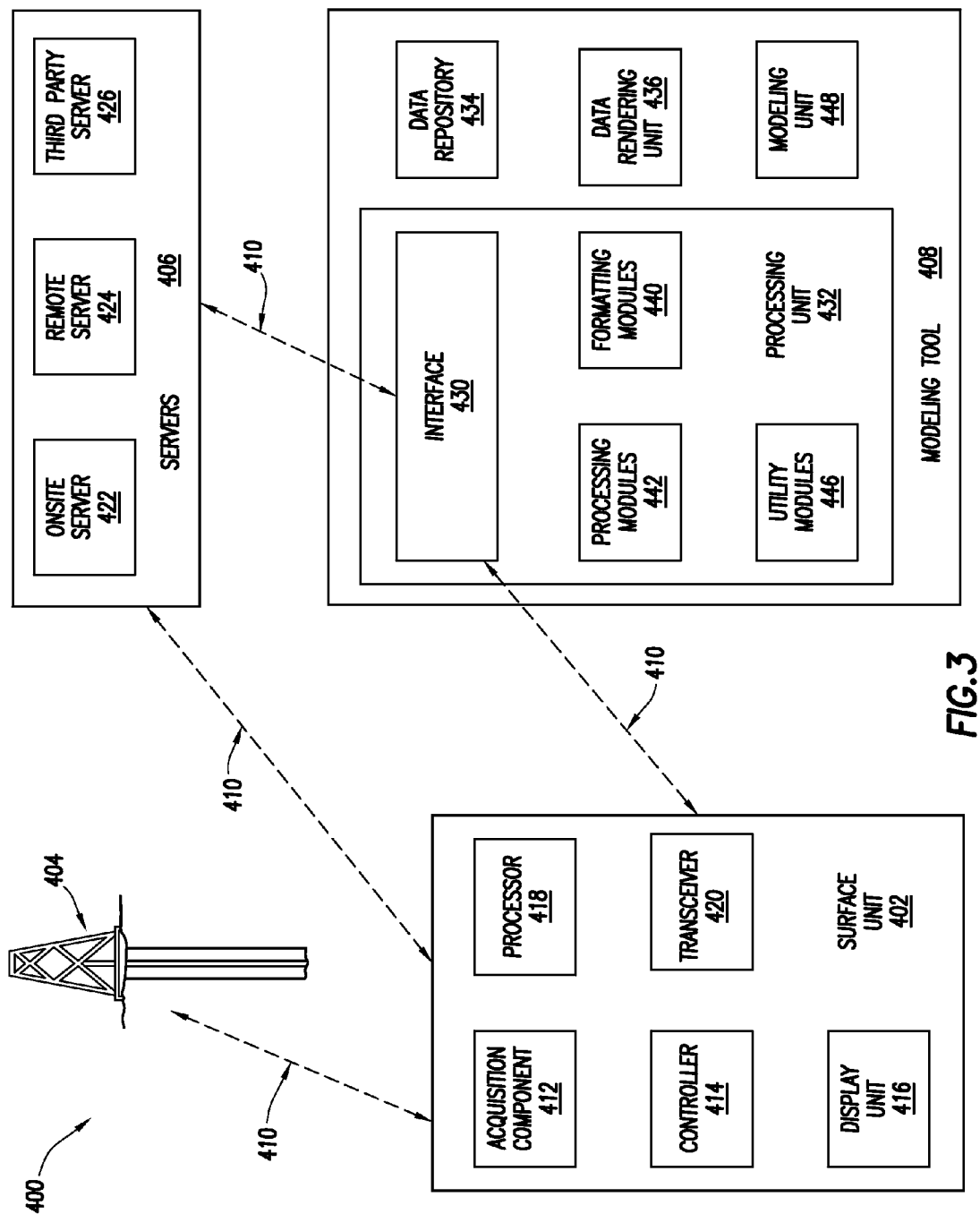
FIG. 3 shows a schematic diagram of a system for performing oilfield operations of an oilfield.

Specific embodiments of the visualizing region growing in 3D voxel volumes will now be described in detail with reference to the accompanying figures. Like elements in the various figures are denoted by like reference numerals for consistency.

In the following detailed description of embodiments of the visualizing region growing in 3D voxel volumes, numerous specific details are set forth in order to provide a more thorough understanding of the visualizing region growing in 3D voxel volumes. In other instances, well-known features have not been described in detail to avoid obscuring the invention.

In general, the visualizing region growing in 3D voxel volumes involves applications generated for the oil and gas industry. FIGS. 1.1-1.4 illustrate an example oilfield (100) with subterranean structures and geological structures therein. More specifically, FIGS. 1.1-1.4 depict schematic views of an oilfield (100) having subterranean structures (102) containing a reservoir (104) therein and depicting various oilfield operations being performed on the oilfield. Various measurements of the subterranean formation are taken by different tools at the same location. These measurements may be used to generate information about the formation and/or the geological structures and/or fluids contained therein.

FIG. 1.1 depicts a survey operation being performed to generate a seismic data output record (124) using recording truck computer (122.1) on a seismic recording truck (106.1) to receive, via geophone-receivers (118), data (120) of sound vibration(s) (112) that reflect off horizons (114) in an earth formation (116) from an acoustic source (110).

FIG. 1.2 depicts a drilling operation being performed by a drilling tool (106.2) suspended by a rig (128) and advanced into the subterranean formation (102) to form a wellbore (136) for reaching the reservoir (104). Drilling mud is circulated through the drilling tool (106.2) via a flow line (132) back to a mud pit (130) on the surface. The drilling tool may be adapted for measuring downhole properties such as adapted for taking a core sample (133). A surface unit (134) with a transceiver (137) collects data output (135) generated during the drilling operation and allows communications between various portions of the oilfield (100) or other locations.

FIG. 1.3 depicts a wireline operation and includes all the elements depicted in FIG. 1.2 except that the drilling tool (106.2) is substituted by a wireline tool (106.3) adapted for performing well logs, downhole tests, collecting samples, and/or performing a seismic survey operation based on an explosive or acoustic energy source (144) in which case the wireline tool (106.3) may provide data output (135) to the surface unit (134).

FIG. 1.4 depicts a production operation being performed by a production tool (106.4) deployed from a production unit or christmas tree (129) and into the completed wellbore (136) of FIG. 1.3 for drawing fluid from the downhole reservoirs (104) into surface facilities (142) via a gathering network (146). Sensors (S) positioned about the oilfield (100) are operatively connected to a surface unit (134) with a transceiver (137) for collecting data (135), for example, reservoir data, wellbore data, surface data and/or process data.

While one wellsite is shown, it will be appreciated that the oilfield (100) may cover a portion of land that hosts one or more wellsites. Part, or all, of the oilfield may be on land and/or sea. Also, the oilfield operations depicted in FIGS. 1.1-1.4 may be performed with any combination of one or more oilfields, one or more processing facilities and one or more wellsites.

FIGS. 2.1-2.4 are graphical depictions of data collected by the tools of FIGS. 1.1-1.4, respectively. FIG. 2.1 depicts a seismic trace (202) of the subterranean formation (102) of FIG. 1.1 taken by survey tool (106.1). FIG. 2.2 depicts a core sample (133) taken by the logging tool (106.2) of FIG. 1.2. FIG. 2.3 depicts a well log (204) of the subterranean formation (102) taken by the wireline tool (106.3) of FIG. 1.3. FIG. 2.4 depicts a production decline curve (206) of fluid flowing through the subterranean formation (102) taken by the production tool (106.4) of FIG. 1.4.

FIG. 3 is a schematic view of a system (400) for performing oilfield operations of an oilfield. As shown, the system (400) includes a surface unit (402) operatively connected to a wellsite drilling system (404), servers (406) operatively linked to the surface unit (402), and a modeling tool (408) operatively linked to the servers (406). As shown, communication links (410) are provided between the wellsite drilling system (404), surface unit (402), servers (406), and modeling tool (408). A variety of links may be provided to facilitate the flow of data through the system. For example, the communication links (410) may provide for continuous, intermittent, one-way, two-way and/or selective communication throughout the system (400). The communication links (410) may be of any type, such as wired, wireless, etc.

The surface unit (402) may be provided with an acquisition component (412), a controller (414), a display unit (416), a processor (418) and a transceiver (420). The acquisition component (412) collects and/or stores data of the oilfield. This data may be data measured by the sensors (S) of the wellsite as described with respect to FIG. 1.1-1.4. This data may also be data received from other sources.

The controller (414) is enabled to enact commands at the oilfield. The controller (414) may be provided with actuation means that can perform drilling operations, such as steering, advancing, or otherwise taking action at the wellsite. Commands may be generated based on logic of the processor (418), or by commands received from other sources. The processor (418) may be provided with features for manipulating and analyzing the data. The processor (418) may be provided with additional functionality to perform oilfield operations.

A display unit (416) may be provided at the wellsite and/or remote locations for viewing oilfield data (not shown). The oilfield data represented by a display unit (416) may be raw data, processed data and/or data outputs generated from various data. The display unit (416) may be adapted to provide flexible views of the data, so that the screens depicted may be customized as desired. A user may plan, adjust, and/or otherwise perform oilfield operations (e.g., determine the desired course of action during drilling) based on reviewing the displayed oilfield data. The oilfield operations may be selectively adjusted in response to viewing the data on the display unit (416). The display unit (416) may include a two-dimensional (2D) display or a three-dimensional (3D) display for viewing oilfield data or various aspects of the oilfield operations. Further, the display (416) may be configured to display voxel (as well as other data) generated by one or more embodiments described below.

The transceiver (420) provides a means for providing data access to and/or from other sources. The transceiver (420) also provides a means for communicating with other components, such as the servers (406), the wellsite drilling system (404), surface unit (402), and/or the modeling tool (408).

The servers (406) may be used to transfer data from one or more wellsites to the modeling tool (408). As shown, the servers (406) include an onsite server (422), a remote server (424), and a third party server (426). The onsite server (422) may be positioned at the wellsite and/or other locations for distributing data from the surface unit. The remote server (424) is positioned at a location away from the oilfield and provides data from remote sources. The third party server (426) may be onsite or remote, but is operated by a third party, such as a client.

The servers (406) are capable of transferring drilling data, such as logs, drilling events, trajectory, and/or other oilfield data, such as seismic data, historical data, economics data, or other data that may be of use during analysis. The type of server is not intended to limit the visualizing region growing in 3D voxel volumes. The system is adapted to function with any type of server that may be employed.

The servers (406) communicate with the modeling tool (408) as indicated by the communication links (410). As indicated by the multiple arrows, the servers (406) may have separate communication links (410) with the modeling tool (408). One or more of the servers (406) may be combined or linked to provide a combined communication link (410).

The servers (406) collect a wide variety of data. The data may be collected from a variety of channels that provide a certain type of data, such as well logs. The data from the servers is passed to the modeling tool (408) for processing. The servers (406) may also be used to store and/or transfer data.

The modeling tool (408) is operatively linked to the surface unit (402) for receiving data therefrom. In some cases, the modeling tool (408) and/or server(s) (406) may be positioned at the wellsite. The modeling tool (408) and/or server(s) (406) may also be positioned at various locations. The modeling tool (408) may be operatively linked to the surface unit via the server(s) (406). The modeling tool (408) may also be included in or located near the surface unit (402).

The modeling tool (408) includes an interface (430), a processing unit (432), a modeling unit (448), a data repository (434) and a data rendering unit (436). The interface (430) communicates with other components, such as the servers (406). The interface (430) may also permit communication with other oilfield or non-oilfield sources. The interface (430) receives the data and maps the data for processing. Data from servers (406) typically streams along predefined channels, which may be selected by the interface (430).

As depicted in FIG. 3, the interface (430) selects the data channel of the server(s) (406) and receives the data. The interface (430) also maps the data channels to data from the wellsite. The data may then be passed to the processing modules (442) of the modeling tool (408). The data is immediately incorporated into the modeling tool (408) for real-time sessions or modeling. The interface (430) creates data requests (for example surveys, logs and/or other volume data sets), displays the user interface, and handles connection state events. The interface (430) also instantiates the data into a data object for processing.

The processing unit (432) includes formatting modules (440), processing modules (442), and utility modules (446). These modules are designed to manipulate the oilfield data for real-time analysis.

The formatting modules (440) are used to conform the data to a desired format for processing. Incoming data may be formatted, translated, converted or otherwise manipulated for use. The formatting modules (440) are configured to enable the data from a variety of sources to be formatted and used so that the data processes and displays in real time.

The utility modules (446) provide support functions to the drilling system. The utility modules (446) include the logging component (not shown) and the user interface (UI) manager component (not shown). The logging component provides a common call for all logging data. This module allows the logging destination to be set by the application. The logging component may also be provided with other features, such as a debugger, a messenger, and a warning system, among others. The debugger sends a debug message to those using the system. The messenger sends information to subsystems, users, and others. The information may or may not interrupt the operation and may be distributed to various locations and/or users throughout the system. The warning system may be used to send error messages and warnings to various locations and/or users throughout the system. In some cases, the warning messages may interrupt the process and display alerts.

The UI manager component creates user interface elements for displays. The UI manager component defines user input screens, such as menu items, context menus, toolbars, and settings windows. The UI manager may also be used to handle events relating to these user input screens.

The processing module (442) is used to analyze the data and generate outputs. As described above, the data may include static data, dynamic data, historic data, real-time data, or other types of data. Further, the data may relate to various aspects of the oilfield operations, such as formation structure, geological stratigraphy, core sampling, well logging, density, resistivity, fluid composition, flow rate, downhole condition, surface condition, equipment condition, or other aspects of the oilfield operations. The data is processed by the processing module (442) into multiple volume data sets for storage and retrieval.

The data repository (434) may store the data for the modeling unit (448). The data may be stored in a format available for use in real-time (e.g., information is updated at approximately the same rate the information is received). The data is generally passed to the data repository (434) from the processing modules (442). The data can be persisted in the file system (e.g., as an extensible markup language (XML) file) or in a database. The system determines which storage is the most appropriate to use for a given piece of data and stores the data in a manner to enable automatic flow of the data through the rest of the system in a seamless and integrated fashion. The system also facilitates manual and automated workflows (such as Modeling, Geological & Geophysical workflows) based upon the persisted data.

The data rendering unit (436) performs rendering algorithm calculation to provide one or more displays for visualizing the data. The displays may be presented to a user at the display unit (416). The data rendering unit (436) may contain a 2D canvas, a 3D canvas, a well section canvas or other canvases as desired. The data rendering unit (436) may selectively provide displays composed of any combination of one or more canvases. The canvases may or may not be synchronized with each other during display. The data rendering unit (436) may be provided with mechanisms for actuating various canvases or other functions in the system. Further, the data rendering unit (436) may selectively provide displays composed of any combination of one or more volume data sets. The volume data sets typically contain exploration and production data, such as that shown in FIG. 2.1-2.4.

The modeling tool (408) performs modeling functions for generating complex oilfield outputs. Examples of such complex oilfield outputs include a visually-melded scene and a segmented geobody as described in detail in FIGS. 4-8 below.

While specific components are depicted and/or described for use in the units and/or modules of the modeling tool (408), it will be appreciated that a variety of components with various functions may be used to provide the formatting, processing, utility and coordination functions necessary to provide processing in the modeling tool (408). The components may have combined functionalities and may be implemented as software, hardware, firmware, or combinations thereof.

Further, components (e.g., the processing modules (442) and the data rendering unit (436)) of the modeling tool (408) may be located in an onsite server (422) or in distributed locations where remote server (424) and/or third party server (426) may be involved. The onsite server (422) may be located within the surface unit (402).

Figure 4:
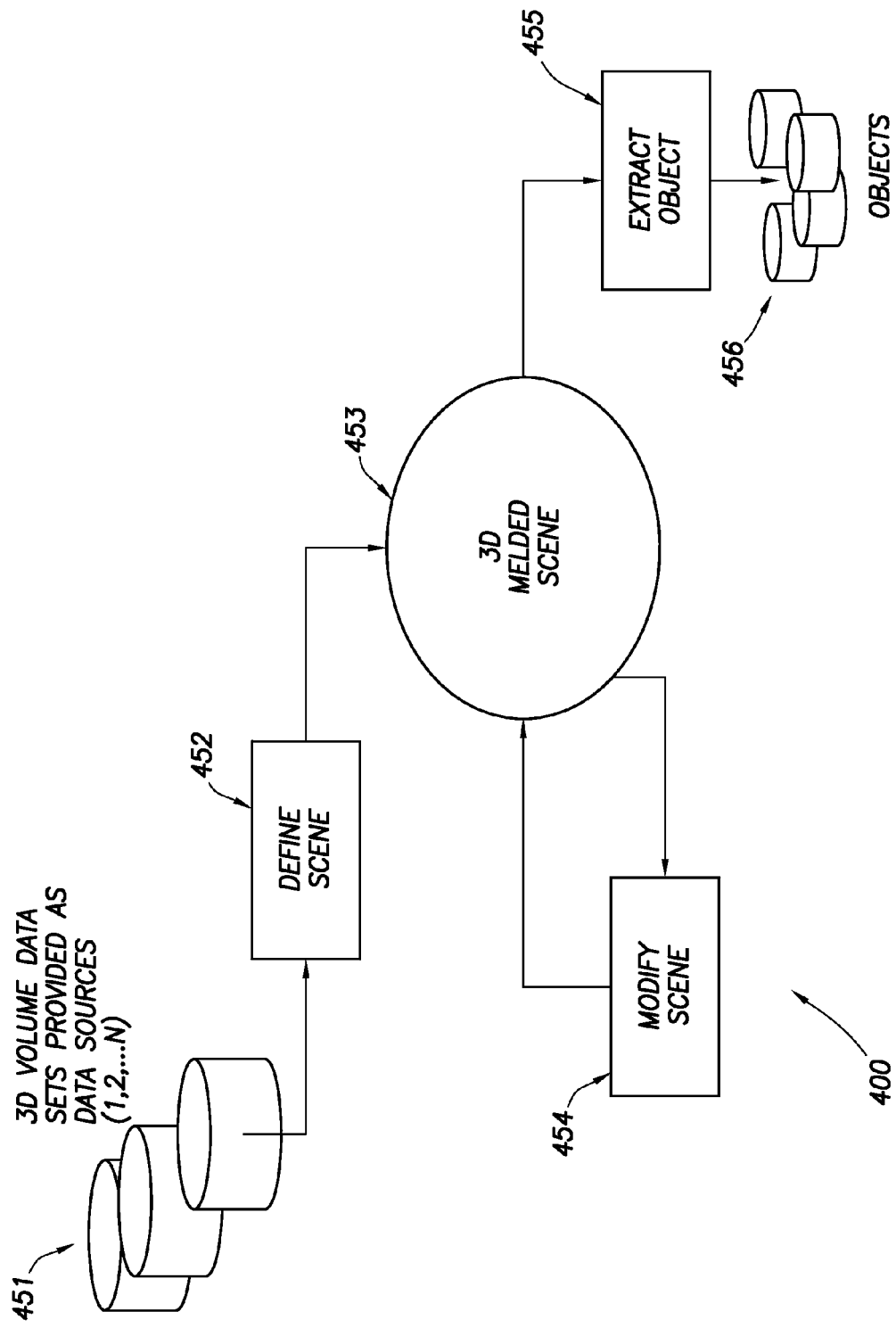
FIG. 4 shows a diagram of workflow components in visualizing and segmenting multiple data sets of oilfield data.

The following embodiments may use data (described in FIGS. 2.1-2.4) obtained from the downhole tools (described in FIGS. 1.1-1.4) and be performed on the systems described in FIGS. 3-4.

FIG. 4-8 depicts visualizing and segmenting multiple volume data sets of oilfield data such as the oilfield data generated by the data acquisition tools of FIG. 1.1. These multiple volume data sets may have different accuracies based on the types of measurements available, quality of data, location and other factors. The multiple volume data sets of FIGS. 4-8 may be taken (or collected) using certain data acquisition tools (e.g., of FIG. 1.1) at a single location of the oilfield. Alternatively, one or more of the same or different data acquisition tools may be used to take (or perform) measurements at one or more locations throughout the oilfield to generate a variety of volume data sets.

FIG. 4 shows a schematic diagram of workflow components in visualizing and segmenting multiple volume data sets of oilfield data. The workflow (400) includes multiple 3D volume data sets (451), a 3D visually-melded scene(s) (or 3D melded scene(s)) (453), a define scene procedure(s) (452), a modify scene procedure(s) (454), an extract object procedure(s) (455), and multiple extracted objects (456).

As described in reference to FIG. 3 above, each of the 3D volume data sets (451) may be stored in the data repository (434) and may include data with associated attributes representing characteristics of subterranean formation (304), such as geometry, location, amplitude, procedure, frequency, or semblance recorded, collected, derived, or otherwise obtained during geologic/seismic survey. For example, the data plots (202) may be processed by the processing modules (442) into multiple 3D volume data sets (451) and stored in the data repository (434). The 3D volume data sets (451) may include various formats known in the art.

In the example shown in FIG. 4, the 3D volume data sets (451) are provided as data sources 1-N for generating the 3D melded scene (453). Each of the extracted objects (456) is a representation of a geologic element or geological structure of the subterranean formation and corresponds to a sub-region within the spatial extent of the multiple 3D volume data sets (451) that is identified as connected non-transparent voxels in the 3D melded scene (453). The collection of these connected non-transparent voxels is referred to as a geobody within the art. The 3D melded scene (453) may be displayed using the display unit (416) as shown in FIG. 3 above.

A user of the workflow (400) may define an initial scene using the define scene procedure (452), which selects two or more volume data sets from the multiple 3D volume data sets (451) and a geometric boundary as a rendering container (not shown). The selected volume data sets are then co-rendered (i.e., rendered directly from multiple volume data sets without combining the multiple volume data sets into an intermediate resultant volume data set and/or rendered concurrently from multiple volume data sets without completing the rendering from any single volume data set before starting the rendering from the rest of the volume data sets) using the define scene procedure (452) to display an initial version of the 3D melded scene (453). The initial version of the 3D melded scene (453) is based on an initial co-rendering rule. The initial co-rendering rule may be modified by the user using the modify scene procedure (454) to "re-render" and modify visual contents of the 3D melded scene (453) until a geobody of interest is visualized.

In addition, the geobody of interest may be identified and/or selected from the 3D melded scene (453) to perform segmentation of the selected volume data sets by using the extract object procedure (455). A representation of the selected geobody may be extracted from the segmented volume data sets into constituent objects (456). For example, the geometry, location, seismic data, or other data and/or attributes contained in the segmented volume data sets associated with the geobody may be extracted by selecting the connected non-transparent voxels corresponding to the selected geobody in the 3D melded scene (453). The segmentation and/or extraction may be initiated by the user providing a 3D coordinate on the geobody of interest in the 3D melded scene (453). Alternatively, automated methods of selecting 3D coordinates such as exhaustive search may be used to select a 3D coordinate to imitate the segmentation and/or extraction. The selected 3D coordinate may be a coordinate referring to a portion of the geobody of interest rendered from any of the selected volume data sets. The selected 3D coordinate may be obtained by placing a 3D cursor or executing a mouse click on the portion of the geobody. The selected 3D coordinate may be a screen coordinate of a voxel or a coordinate contained in the selected volume data sets and can be translated to a physical coordinate of a location in a subterranean formation, such as the subterranean formation.

In general, the workflow (400) does not require that selected data sets be combined into a resultant data set before it is rendered. As a result, one or more embodiments eliminate processing delays and provide interactive capabilities to the modify scene procedure (454), see e.g., FIG. 6. Further, the workflow (400) typically does not limit the segmentation to one primary data set of the multiple data sets (451), see, e.g., FIG. 7.

Figure 5:
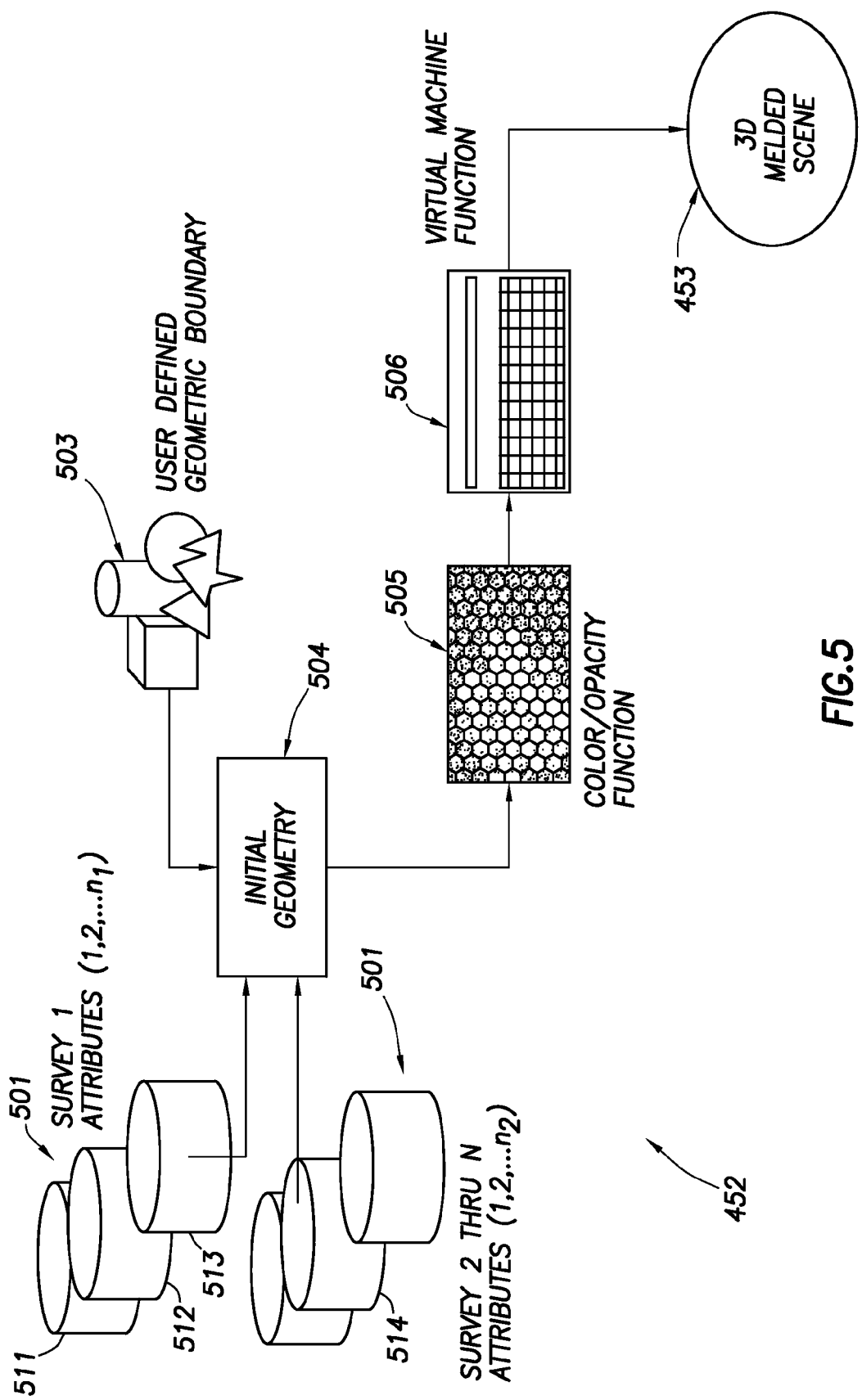
FIG. 5 shows a diagram of the define scene procedure in visualizing and segmenting multiple data sets of oilfield data.

FIG. 5 shows a schematic diagram of the define scene procedure (452 in FIG. 4) in visualizing and segmenting multiple data sets of oilfield data. The define scene procedure (452) includes survey 1 (501), surveys 2-N (502), a user defined geometric boundary (503), an initial geometry (504), a color/opacity function (505), a virtual machine function (506), and a 3D melded scene (453). The survey 1 (501) and surveys 2-N (502) include multiple 3D volume data sets, which may be the same as the multiple 3D volume data sets (451) as shown in FIG. 4 above. The user-defined geometric boundary (503) includes various geometric shapes and may be used to compose the initial geometry (504) to limit a portion (e.g., a portion of the spatial extent) of the multiple 3D volume data sets (451) for rendering the 3D melded scene (453). The color/opacity function (505) includes multiple color tables and opacity tables for co-rendering the 3D melded scene (453). The virtual machine function (506) includes numerical and/or logical functions to scale, combine, or otherwise manipulate the contents of the 3D volume data sets, the color tables, and/or the opacity tables.

The survey 1 (501) includes multiple 3D volume data sets (e.g., 511, 512, and 513) having multiple attributes (e.g., attributes $1\text{-}n_1$). The survey 1 (501) may be provided as data source 1 as shown in FIG. 4 above. The multiple attributes (e.g., attribute $1\text{-}n_1$) may represent various characteristics of subterranean formation (304), such as location, amplitude, procedure, frequency, or semblance recorded, collected, derived, or otherwise obtained during geologic/seismic survey shown and described in relation to FIG. 1.1.

Similarly, the surveys 2-N (502) may be 3D volume data sets provided as data sources 2-N, as shown in FIG. 4 above. Surveys 2-N (502) may include a 3D volume data set (514). In one example, the 3D volume data sets (511, 512, 513, and 514) may include different versions of a single survey having the same seismic attribute, where each 3D volume data set may have the same spatial extent. In other examples, these 3D volume data sets may include different data from different surveys and correspond to different spatial extents and/or different scales. Further, these spatial extents, although different, may be overlapping with one another.

In the example shown in FIG. 5, the 3D volumes data sets (513, 514) may be selected by a user of the workflow (400) for co-rendering the 3D melded scene (453). The 3D volumes data sets (513) and (514) may be overlapping in their spatial extents. The initial geometry (504) may be used to limit the co-rendering within a subset of the spatial extents of the 3D volumes data sets (513, 514). Various different components of the user defined geometric boundary may be used to compose the initial geometry (504). The initial geometry (504) may be composed as a single geometric boundary to limit the co-rendering from both the 3D volumes data sets (513, 514). Alternatively, the initial geometry (504) may include multiple overlapping geometric containers, such as a first and a second overlapping geometric container, where the first container limits the co-rendering from a first 3D volumes data set (e.g., 513) and the second container limits the co-rendering from a second 3D volumes data set (e.g., 514).

These overlapping geometric containers may each be associated with a separate co-rendering rule for co-rendering from 3D volume data sets with overlapping spatial extents. Each of these co-rendering rules may includes an independent control of color and opacity within each of the geometric containers, as well as corresponding numerical/logical functions for manipulating the contents of the 3D volume data sets, the color tables, and/or the opacity tables within the overlapping spatial extents of the geometric containers. For example, an initial version of the color/opacity function (505) may include a first color/opacity table for rendering the 3D volume data set (513) within a first geometric container of the initial geometry (504). The color/opacity function (505) may also include a second color/opacity table for rendering the 3D volume data set (514) within a second geometric container of the initial geometry (504). For example, an initial version of the virtual machine function may be a default condition where the contents of the 3D volume data sets are not scaled and the color/opacity tables are not combined.

Each color/opacity table may include information relating to specific color/opacity settings of voxels corresponding to data/attribute values contained in a 3D volume data set, as is well known within the art. The color table may be defined to highlight connected, non-transparent voxels for investigating a geobody of interest in the 3D melded scene (453). In addition, the opacity table may be defined to render a selected range of data/attribute values non-transparent. The transitions from transparent or near transparent voxels to opaque or near opaque voxels in the 3D melded scene (453) depends on the transitions of data/attribute values in the 3D volume data set and may define a noticeable opacity boundary. This functionality allows the user of the workflow (400) to selectively adjust the 3D melded scene (453) and reveal intricate details from a complex display.

Although the example given above includes two selected 3D volume data sets, it will be appreciated that the method described in FIG. 5 is applicable to co-rendering from multiple 3D volume data sets and is not limited to co-rendering from two data sets.

Figure 6:
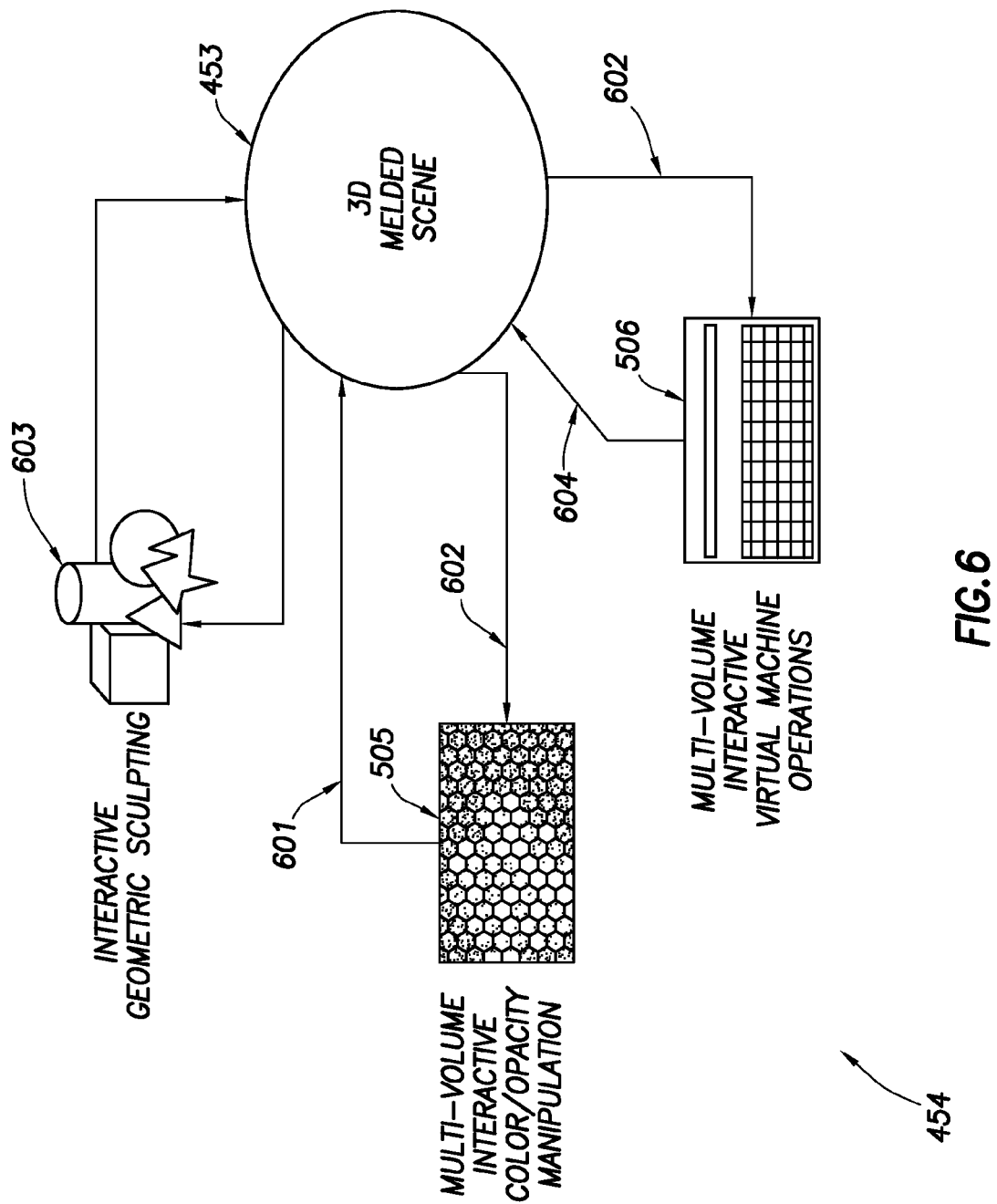
FIG. 6 shows a diagram of the modify scene procedure in visualizing and segmenting multiple data set of oilfield data.

FIG. 6 shows a schematic diagram of the modify scene procedure (454 in FIG. 4) in visualizing and segmenting multiple data sets of oilfield data. The modify scene procedure (454) includes multiple geometric sculpting forms (603), the color/opacity function (505), the virtual machine function (506), and the 3D melded scene (453). The color/opacity function (505), the virtual machine function (506), and the 3D melded scene (453) may be the same as shown and described in relation to FIG. 4 above. The multiple geometric sculpting forms (603) may include similar geometric shapes as the user defined geometric boundary (503) shown and described in relation to FIG. 4 above.

The modify scene procedure (454) may be used by the user of the workflow (400) to interact with the contents rendered in the 3D melded scene (453) and to visually isolate connected sub-regions of interest in the 3D melded scene (453). For example, the color/opacity function (505) may be used by the user to perform multi-volume interactive color/opacity manipulation, i.e., independently manipulating (601) the color/opacity table within each overlapping geometric containers based on interactive feedback (602) of visually connected sub-regions of interest in the 3D melded scene (453). The final rendering may be further controlled using the virtual machine function (506) to provide multi-volume interactive virtual machine operations, i.e., independently manipulating (604) the numerical/logical functions within each overlapping geometric container based on interactive feedback (602) of visually connected sub-regions of interest in the 3D melded scene (453).

The numerical/logical functions may be used to scale, combine, or otherwise manipulate the contents of the 3D volume data sets, the color tables, and/or the opacity tables. For example, it may be necessary to match the scales (e.g., using a numerical scaling function) of data/attribute values contained in the 3D volume data sets obtained from different surveys. Data/attribute values contained in the 3D volume data sets obtained from different versions of a single survey may be selectively combined (e.g., using numerical add, multiply function, logical AND, OR function, or other suitable numerical/logical functions) to associate different weightings to the different versions. Color/opacity tables associated with different geometric containers including different 3D volume data sets may also be selectively combined (e.g., using numerical add, multiply function, logical AND, OR function, or other suitable numerical/logical functions) to enhance, realize, emphasize, accentuate, or otherwise make visible connected sub-regions of interest in the 3D melded scene (453).

The color/opacity function (505) and the virtual machine function (506) may be interactively updated (601, 604) by the user observing (602) the dynamic effect on the visual content of the 3D melded scene (453) via an interactive user interface, which may include a window or a text box and may be commonly referred to as a graphical "widget." Moreover, the visually connected sub-regions of interest in the 3D melded scene (453) may be further manipulated (e.g., sculpted) by the user using the multiple geometric sculpting forms (603) to fine tune the geobody of interest. For example, each of the multiple geometric sculpting forms (603) may act as a mask to the rendered data thus behaving as a user-defined opacity boundary to delineate at least a portion of the contour of a geobody in the 3D melded scene (453).

Referring back to FIG. 4, based on co-rendering the 3D melded scene (453) concurrently and directly from two or more volume data sets using a combined rendering rule (without combining the two or more volume data sets into an intermediate resultant volume data set), the define scene procedure (452) and the modify scene procedure (454) allow the user to interactively produce a visual 3D image where multiple sub-regions of interest in the 3D melded scene (453) may be isolated from one another by transparent or near-transparent voxels. Each of these multiple sub-regions of interest may not be realizable from any single 3D volume data set and may be visually identified based on combined opacity boundaries from multiple 3D volume data sets. Once a region of interest in the 3D melded scene (453) is visually identified, it may be extracted using the extract object procedure (455).

Figure 7:
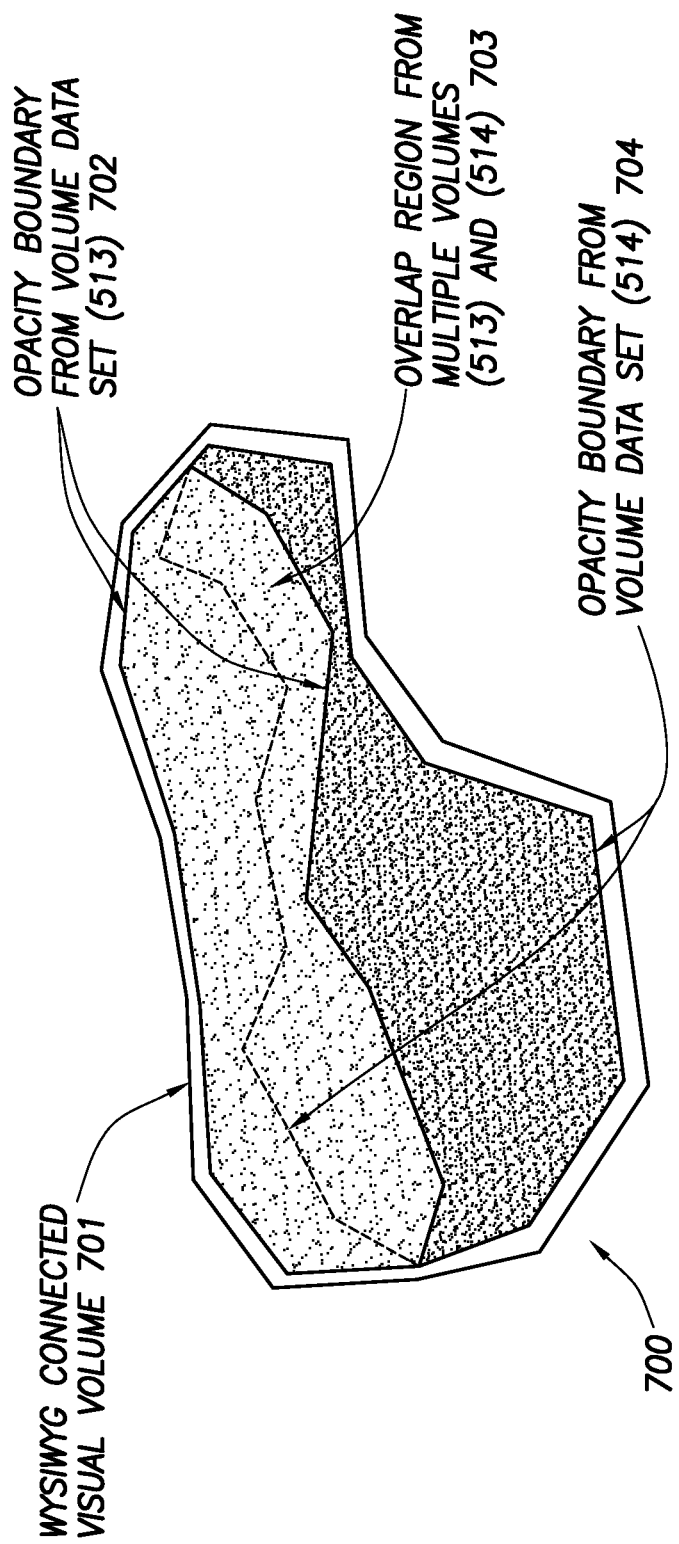
FIG. 7 shows a diagram of multi-volume extraction of a geobody.

FIG. 7 shows a schematic diagram of multi-volume extraction in visualizing and segmenting multiple data sets of oilfield data. In FIG. 7, the geobody (700) is shown as a connected visual object (701) that includes opacity boundaries (702, 704), and an overlap region (703). The connected visual object (701) is rendered from the 3D volume data sets (513, 514) that have an overlapping spatial extent. The 3D volume data sets (513, 514) are rendered as having the opacity boundaries (702, 704) as well as a overlap region (703) representing the overlapping spatial extent. The geobody (700) may correspond to one of the extracted objects (456) as shown in FIG. 4 and may represent a geologic element or geological structure of the subterranean formation (304).

As described above, the opacity boundaries (702, 704) and overlap region (703) may be visually manipulated by the user interactively controlling the color/opacity tables and geometric containers corresponding to the 3D volume data sets (513, 514), independently, until the geobody (700) is visually identified in the 3D melded scene (453). In one example, a voxel within either the first geometric container corresponding to the 3D volume data set (513) or the second geometric container corresponding to the 3D volume data set (514) may be rendered as having an opacity according to the respective opacity table based on the association with the first or the second geometric container. The geobody may then be identified by the overlapping opacity boundaries (702, 704).

In another example, the color and opacity of the 3D melded scene (453) may be determined by operations between multiple 3D volume data sets using the virtual machine function (506). For example, the color and opacity of the geobody (700) may be determined by an opacity weighted sum scheme or a direct product scheme. In the first example, a voxel within the first geometric container corresponding to the 3D volume data set (513) is rendered as having a first color and a first opacity according to a first color/opacity table based on the association with the first geometric container. If the voxel is also within a second geometric container corresponding to the 3D volume data set (514), the voxel is normally rendered as having a second color and a second opacity according to a second color/opacity table based on the association with the second geometric container. The color and opacity of the portion of the voxel within the overlapping spatial extent is determined as follows: (i) voxel color is rendered as ((first opacity*first color)+(second opacity*second color))/(first opacity+second opacity) and (ii) voxel opacity is rendered as (first opacity+second opacity).

Alternatively, in the second example, using the direct product scheme, the voxel color in the overlapping spatial is rendered as (first color*second color) and the voxel opacity in the overlapping spatial is rendered as (first opacity*second opacity).

Once the geobody (700) is visually identified and selected for extraction from the 3D melded scene (453), the extraction may be performed according to connectivity based segmentation. The connectivity may be defined in many ways known within the art, such as a Marching Cube algorithm or an exhaustive search from a seed point based on face-edge-corner connectivity. Based on co-rendering the 3D melded scene (453) concurrently and directly from multiple volume data sets without combining them into an intermediate resultant volume data set, the extraction may be performed concurrently from the multiple 3D volume data sets, such as the 3D volume data sets (513) and (514) described above.

Figure 8:
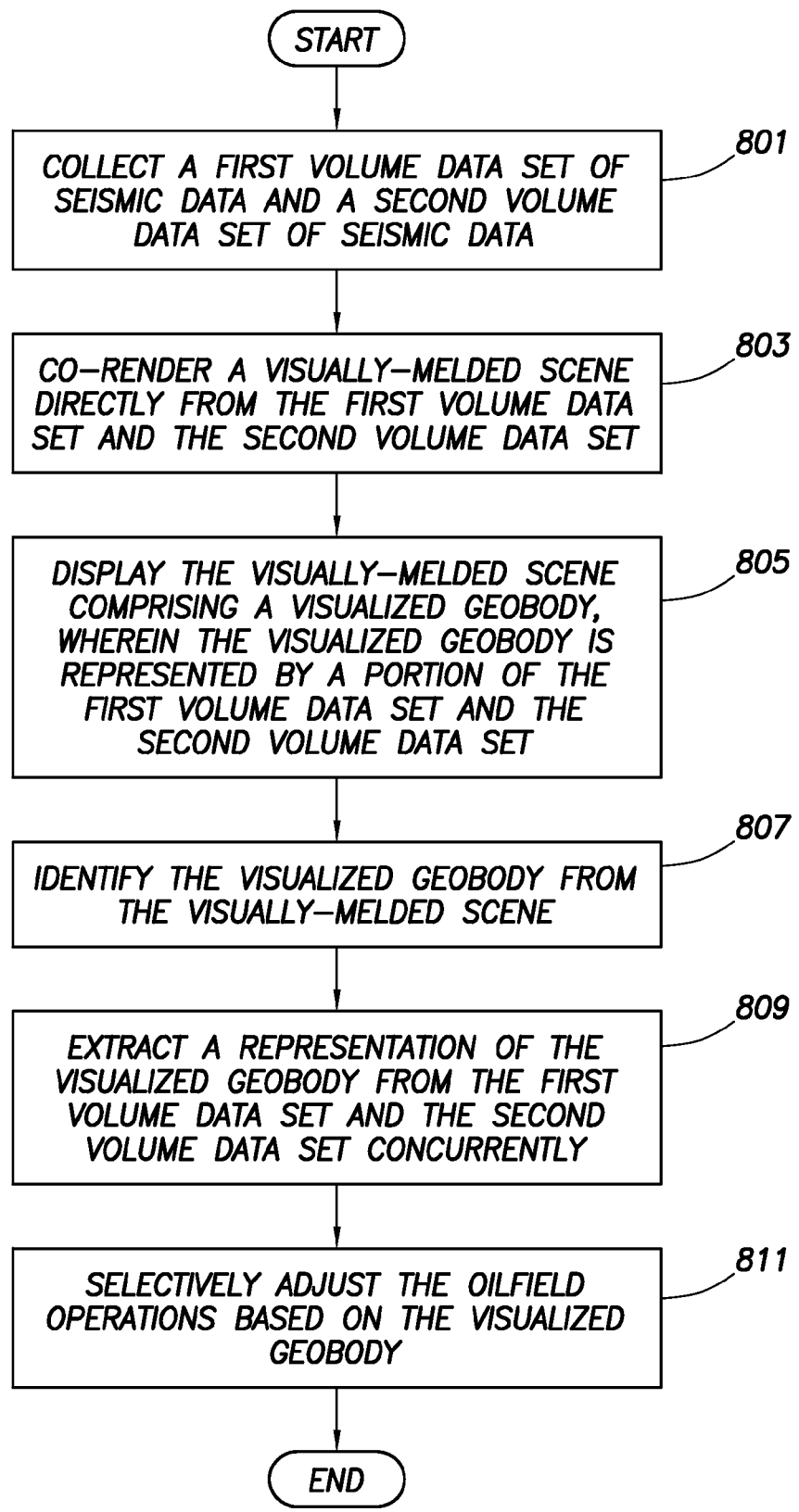
FIG. 8 shows a flow chart of method for visualizing and segmenting multiple volume data sets of oilfield data.

FIG. 8 shows a flow chart of a method for visualizing and segmenting multiple data sets of oilfield data. In one or more embodiments, one or more of the elements shown in FIG. 8 may be omitted, repeated, and/or performed in a different order. Accordingly, embodiments should not be considered limited to the specific arrangement of elements shown in FIG. 8.

Initially, a first volume data set and a second volume data set are collected (Element 801). The first volume data set and the second volume data set may correspond to the 3D volume data set (513) and the 3D volume data set (514), as shown in FIG. 5 above. Further, the volume data set may be collected using the sensors and methods described above and shown in relation to FIGS. 1-3.

In Element 803, a visually-melded scene is co-rendered (i.e., rendered directly from multiple volume data sets without combining the multiple volume data sets into an intermediate resultant volume data set and/or rendered concurrently from multiple volume data sets without completing the rendering from any single volume data set before starting the rendering from the rest volume data sets) directly from the first volume data set and the second volume data set.

In Element 805, the visually-melded scene including a visualized geobody, is displayed, where the visualized geobody is represented by a portion of the first volume data set and the second volume data set.

In Element 807, the visualized geobody is identified from the visually-melded scene. The identification may be performed using any of the examples as described in reference to FIGS. 6 and 7 above. In Element 809, a representation of the visualized geobody from the first volume data set and the second volume data set is extracted concurrently.

In Element 811, an oilfield operation is selectively adjusted based on the visualized geobody. As described above, the geobody may be a representation of a geologic element or geological structure of the subterranean formation. For example, the geologic structure may be identified as a target fluid distribution, a fault structure, a sand stone formation, a shale formation, etc. in the subterranean formation. Further, the oilfield operation may be one of the oilfield operations as depicted in FIGS. 1.1-1.4 to be performed or being performed on the subterranean formation. For example, an access strategy (e.g., a drilling strategy) may be developed based on the visualized subterranean target fluid distribution.

FIGS. 9-14 describe methods for user control of the proximity tolerance and shape, as well as honoring pre-computed properties of the geometric primitives using control parameters associated with, for example voxels attributes or locations. Example techniques include positioning a filtering proximity operator in a 3D scene (i.e., three-dimensional space of seismic voxels representing one or more 3D seismic volumes).

Figure 9:
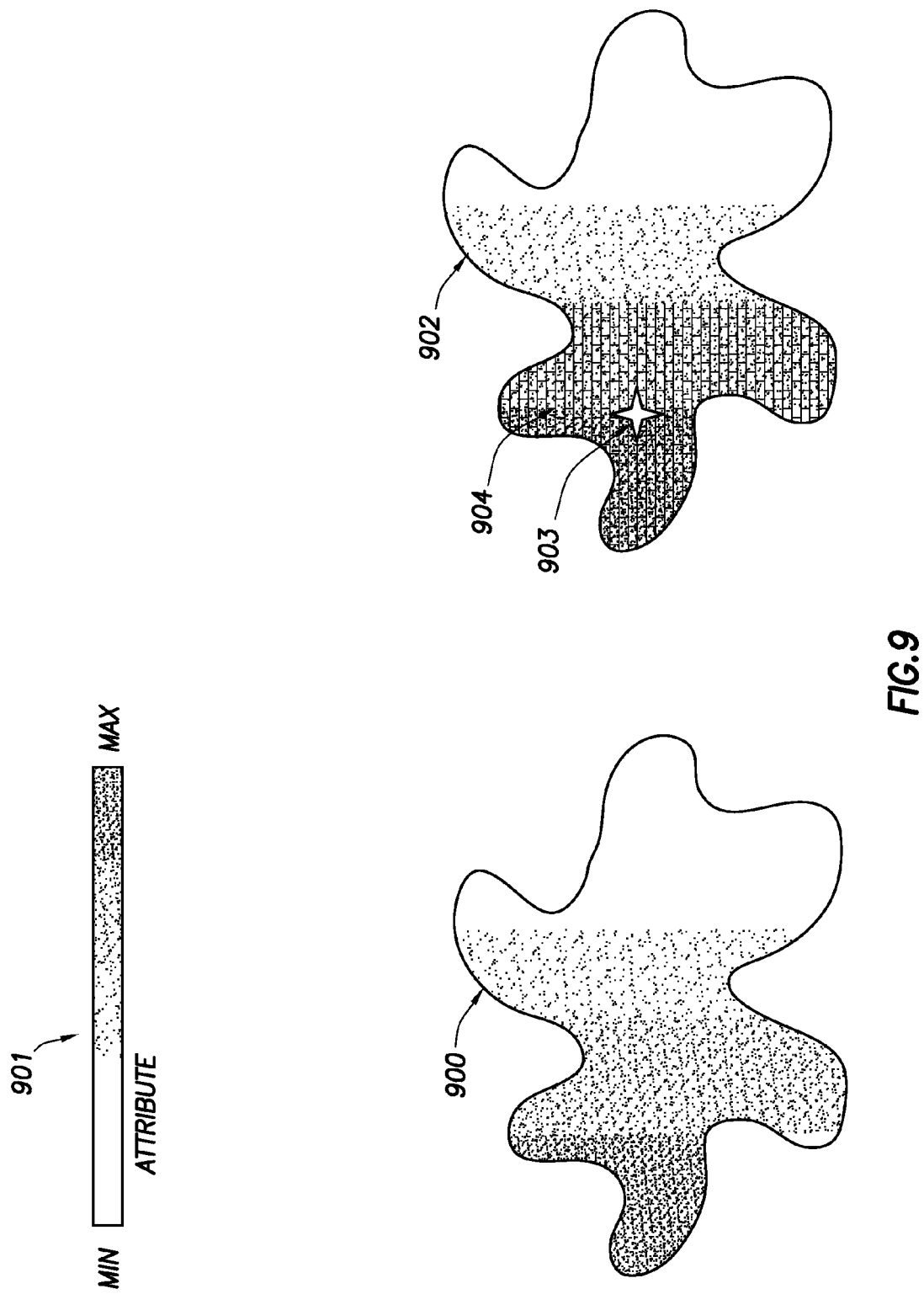
FIG. 9 shows a diagram depicting an example segmentation algorithm for segmenting a 3D volume data set.

FIG. 9 shows a diagram depicting an example segmentation algorithm for segmenting a 3D volume data set. The diagram uses a 2D representation to depict a collection (900) of seismic voxels of the 3D volume data set. The collection (900) is rendered and displayed using red color (represented in cross hatch pattern in FIG. 9 for illustration purpose, where the density of cross hatch represents the shade of the color) to represent the value of an attribute associated with each of the voxels. The choice of rendering color is arbitrary for visualization purposes. The bar scale (901) depicts the rendering rule where the attribute value ranges from minimum at the left end to the maximum at the right end of the bar scale (901). The minimum and maximum defines a range of attribute values exhibited by the voxels in the collection (900). As shown in FIG. 9, the voxels located toward the left side of the collection (900) generally exhibit higher attribute values indicated by the deeper red color (represented in cross hatch pattern for illustration purpose where the density of cross hatch represents the darkness of the color).

Further as shown in FIG. 9, the collection (902) of seismic voxels represents the same collection (900) after applying a segmentation algorithm where the user selects a seed-point (903) within the collection (902) and the segmentation algorithm grows the seed point (903) into neighboring voxels based on connectivity. Connectivity is typically determined based on a seismic attribute threshold (or pre-determined threshold). For example, if the seismic attribute value of neighboring voxels is above a pre-determined threshold, they are connected by the segmentation algorithm to grow into a geobody (904). The geobody (904) is represented by the collection of tiles located in the right half of the collection (902). Depending on the configuration of the segmentation algorithm, a geobody may also be grown by connecting neighboring voxels (i) with attribute values below the pre-determined threshold, (ii) with attribute values within a data range having pre-determined upper and lower thresholds, and/or (iii) with attribute values that satisfy a pre-determined threshold based on certain criteria.

In other examples where multiple attributes are available, control parameters may be configured to assign weightings to the various attributes. In such scenarios, the weighted sum of the attributes may be used to select which neighboring voxels may be used to growing the geobody. Initial state of growth may start from a single seed point where connected geobodies are found after a growing phase. Initial state of growth may also start from a fully grown geobody that may shrink into multiple connected components after a dying phase. A weighting between the selected attributes may make a voxel more favorable or less favorable for growth depending on the segmentation algorithm. If a seed point is selected as initial state, those favorable areas connected to the seed point are grown in to the geobody. By adjusting starting weights, an initial strong growth may be selected to widen search to a larger area in the 3D scene. Subsequently, the weightings may be reduced or otherwise adjusted to favor segmentation of smaller connected components of interest to the user. Examples of adjusting the weightings may include modifying the threshold corresponding to the attribute based on the control parameters.

FIGS. 10.1-10.3 show diagrams depicting example segmentation algorithms with control parameters. As shown in FIG. 10.1, the collection (1022) of seismic voxels may represent the same collection (900) after applying a segmentation algorithm based on three different attributes: attribute 1, attribute 2, and attribute 3. The collection (1022) is rendered and displayed using different colors (red, blue and green, which are represented in FIGS. 10.2 and 10.3 as different cross hatch patterns for illustration purpose) representing the values of the three corresponding attributes. The attribute colors and cross hatch patterns are chosen arbitrarily for visualization purposes. The bar scale (1027) depicts the rendering rule where the attribute values of attributes 1-3 range from minimum values at the left end to maximum values at the right end of the bar scale (1027). The minimum and maximum values define three ranges of attribute values of attributes 1-3 exhibited by the voxels in the collection (1022). As shown in FIG. 10.1, the voxels located toward the left side of the collection (1022) generally exhibit higher value of attribute 1 as indicated by the deeper red color. The voxels located toward the lower right side of the collection (1022) generally exhibit higher values of attribute 2 as indicated by the deeper blue color. The voxels located toward the upper right side of the collection (1022) generally exhibit higher values of attribute 3 as indicated by the deeper green color. In FIG. 10.1, the deeper red, deeper blue, and deeper green colors are represented in respective cross hatch patterns for illustration purpose where the density of cross hatch represents the shaded of the color.

Further, as shown in FIG. 10.1, a seed-point (1021) may be selected by a user within the collection (1022) and the segmentation algorithm may grow the seed point (1022) by comparing the seismic attribute value of neighboring voxels to pre-determined thresholds (1026) shown on the bar scale (1027). The growth is typically based on connectivity as described with respect to FIG. 9 above. Control parameters (1023-1025) are shown to be neutral to the three attributes without favoring any particular attribute. Accordingly, the growth of the geobody based on the segmentation algorithm depends on a general growth parameter (not shown).

FIG. 10.2 depicts an example of the segmentation algorithm guided by control parameters for enhancing directional growth. As shown in FIG. 10.2, the collection (1002) of seismic voxels represents the same collection (1022) of FIG. 10.1 after applying a segmentation algorithm where the control parameter (1023) is configured to enhance directional growth favoring attribute 1. The directional growth may be enhanced by selectively adjusting the weightings or modifying the pre-determined thresholds (1026) based on the control parameters (1023-1025) as shown in the bar scale (1027) of FIG. 10.2. Accordingly, the generated geobody (1001) is generated and represented by the collection of tiles located in the right half of the collection (1002), where voxels generally exhibit higher values of attribute 1 and, therefore, reflect the enhanced directional growth more readily.

FIG. 10.3 depicts another example of the segmentation algorithm guided by a control parameter for enhancing directional growth. As shown in FIG. 10.3, the collection (1012) of seismic voxels represents the same collection (1022) of FIG. 10.1 after applying a segmentation algorithm where the control parameters (1013, 1014) are configured to enhance directional growth favoring the attributes 1 and 2. In addition, the control parameter (1015) is configured to inhibit directional growth associated with the attribute 3. Accordingly, the generated geobody (1011) is generated and represented by the collection of tiles located in the lower half of the collection (1012) where voxels generally exhibiting lower values of attribute 3.

The control parameters (1023-1025) may be adjusted by a user based on interim results of the segmentation algorithm. For example, geobody (1001) may be evaluated by a user to determine an adjustment of the control parameters from the configuration shown in FIG. 10.2 to the configuration shown in FIG. 10.3.

Alternatively, the control parameters (1023)-(1025) may be adjusted automatically. A machine learning system may be used in conjunction with the segmentation algorithm to control the weightings associated with the attributes during growth. The machine learning system may be set up to control weightings in such a way that a count and/or size of segmented geobodies are generated and compared to a target count and/or size determined by the user. The machine learning system may be trained, for example using back propagation or any other machine learning methodology known in the art.

The control parameters may also vary with time during which the segmentation algorithm is performed. FIG. 11 shows a diagram depicting an example segmentation algorithm with time varying control parameters. As shown in FIG. 11, the horizontal axis represents a time scale along which the segmentation algorithm is executed in growing the geobody. The vertical axis represents control parameters corresponding to attributes of voxels in the 3D volume data set. The control parameter (1101) favoring attribute 1 is shown to become more dominant as time progress while control parameters (1102)-(1103) favoring attributes 2 and 3 are shown to become less dominant after an initial growth phase. Specifically, in the beginning stage, three attributes are favorable to cover a certain area in the 3D scene. After a certain time period, the control parameters are adjusted such that there is no segmentation in voxels with high values of the attribute 3 and lower segmentation in voxels with high values of the attribute 2.

Figure 12:
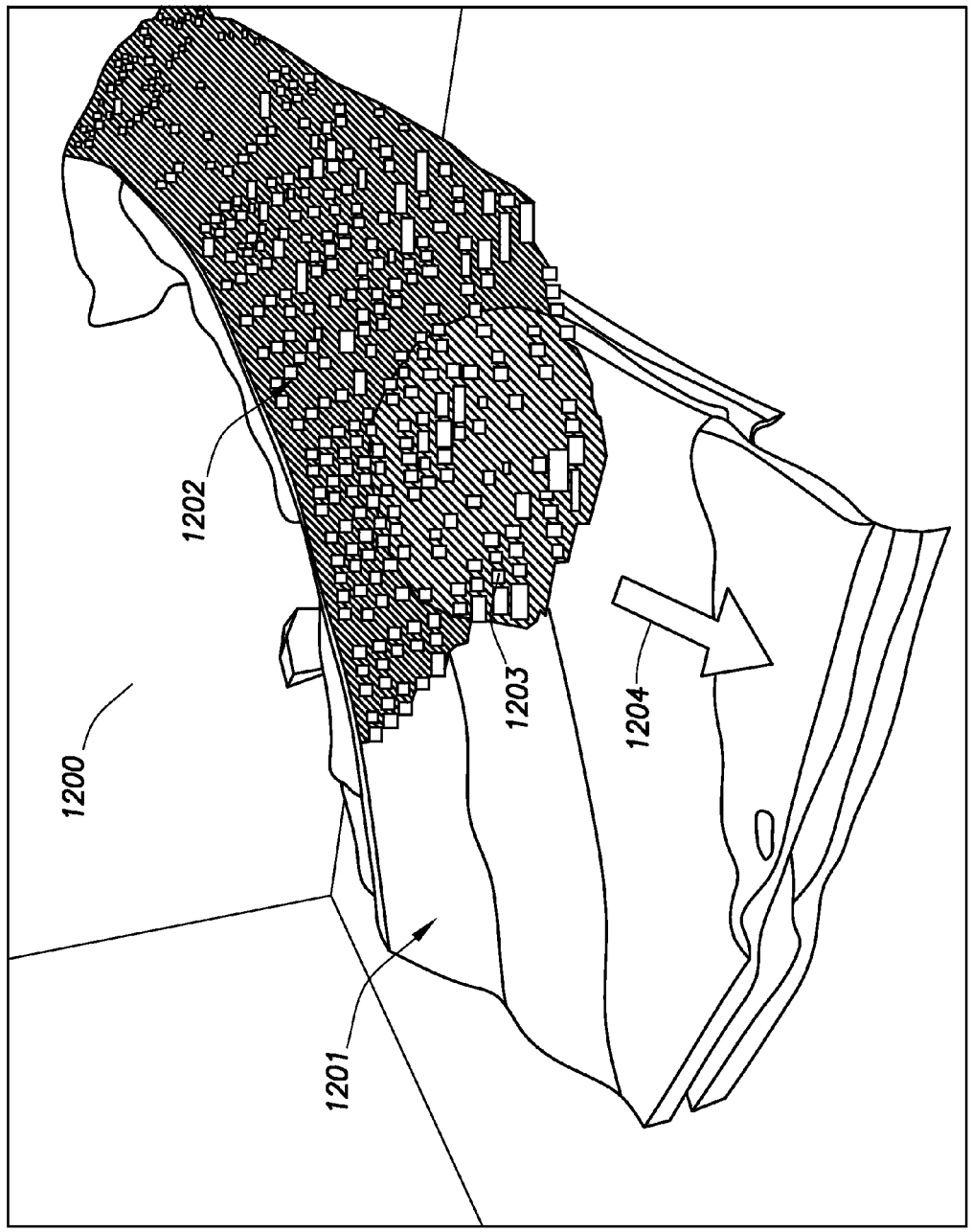
FIGS. 12-13 show diagrams depicting example segmentation algorithms with user guided control parameters.
Figure 13:
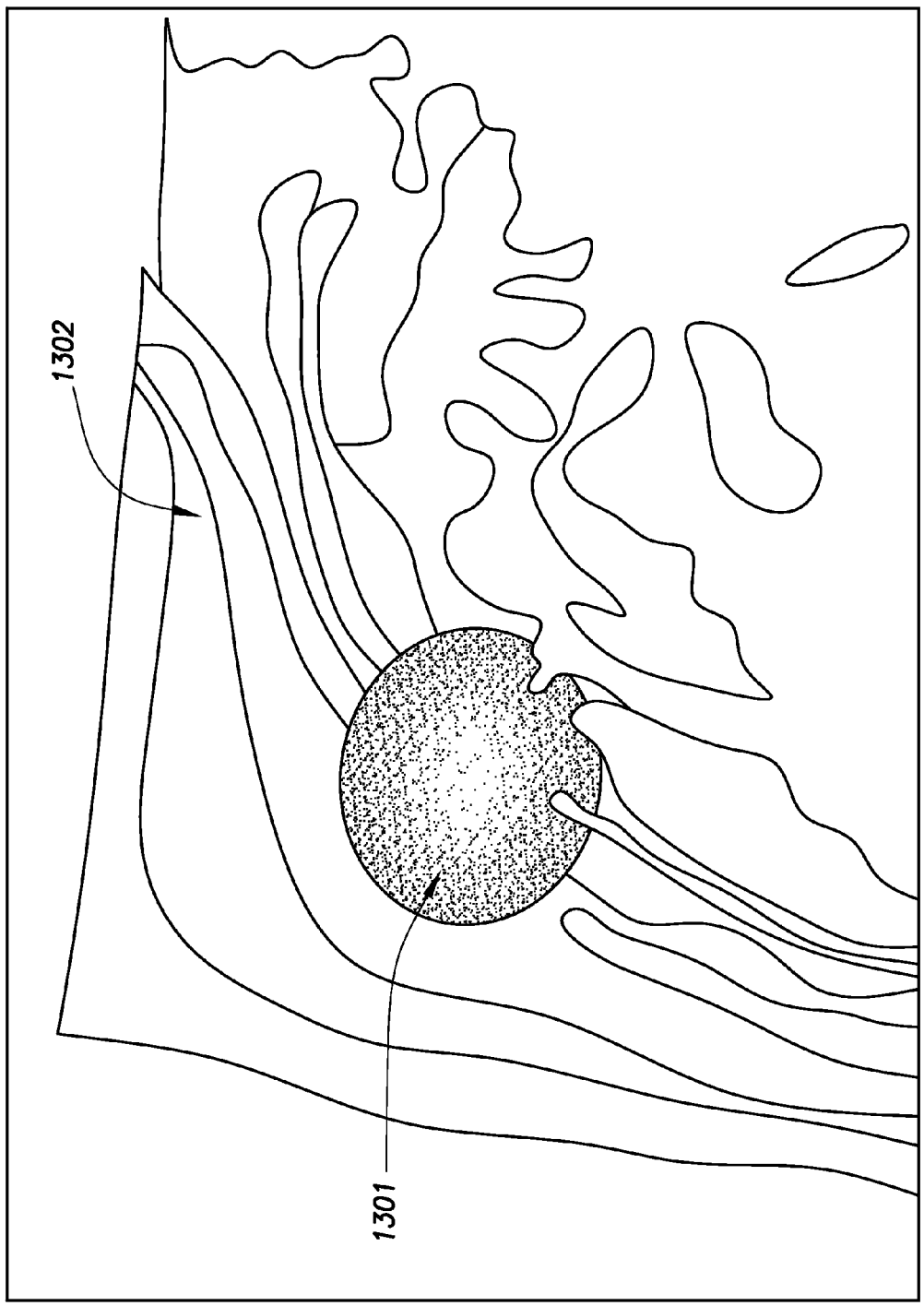

As described above, various control mechanisms may be defined to allow user interactions during the growing process by manipulating the number of attributes and attribute effects such as the control parameters as described with respect to FIGS. 9 and 10.1-10.3. In addition to guiding the segmentation algorithm by adjusting the weightings and/or modifying the pre-determined thresholds associated with the attributes, the user may also interact with the growing process to enhance or reduce growth in certain areas within the 3D scene using location specific control parameters. Referring to FIGS. 12-13, techniques emulating spray painting in physical world are described with respect to FIGS. 12-13 below. These techniques allow a user to guide automatic segmentation by moving a 3D spray paint/paint brush object over seismic amplitude or attribute voxels. The paintbrush object may have controls for brush volume, softness, and time-dependent saturation during user manipulation of the tool.

As shown in FIG. 12, a 3D scene (1200) includes a collection of 3D seismic voxels (1201) depicted in non-black colors (represented as cross hatch patterns for illustration). The collection (1201) may include a segmented portion representing a geobody (1202) depicted in deeper orange color. A smart grower sphere (1203) depicted in light orange may be positioned anywhere in the 3D scene (1200). Here, the colors of the geobody (1202) and the smart grower sphere (1203) are represented in cross hatch patterns for illustration purpose where the density of cross hatch represents the shade of the color. The smart grower sphere (1203) may represent, for example a filtering proximity operator. In general, an automatic segmentation algorithm or a threshold modifying algorithm may be executed inside the smart grower sphere (1203), growing an existing geobody (e.g., the geobody (1202)) into the seismic voxels that are spatially connected with an attribute value above a given threshold.

Further as shown in FIG. 12, a user may perform an MB1 (i.e., mouse button one or the left mouse button) drag of the smart grower sphere (1203) along direction (1204) through the seismic voxels in the collection (1201). In response to this action, geobody voxels (1202) are grown into the seismic voxels along path of the MB1 drag. (1200). The aforementioned embodiments enable the user to easily define where to perform the segmentation.

Positioning a 3D object (e.g., a smart grower tool such as the smart grower sphere (1203)) correctly using a 2D input device is not trivial. As opposed to 2D painting tools, the user is able to control the z position relative to the screen projection plane (in other words; how "deep" into the screen the tool should be positioned). When using the mouse as the user input device, an imaginary ray is extends from the mouse cursor in the screen projection plane (i.e., the rectangular viewing area of the computer screen) into the space along a view direction defined in the imaginary 3D space. The 3D object representing a smart grower tool such as the smart grower sphere (1203)) may then be positioned anywhere the ray interests with the collection (1201). This technique is quite intuitive and effective, as it is based on what is visible on screen. An alternative method to position the 3D object in 3D space is to use a VR wand. The VR wand is similar to the mouse device but has six degrees of freedom (i.e., left-right, up-down, and in-out). Using the VR wand, the 3D object may be positioned and moved anywhere in the 3D scene (1200), even behind the collection (1201) that is displayed on screen.

As the 3D object is operating on voxels, associated algorithms are based on voxel coordinates. For each mouse or VR wand selection, the voxel indices (inline, xline, time) of the intersected voxel are calculated. The calculated intersection is the nearest voxel with an alpha value above a given threshold that intersects the selection made by mouse of VR wand. For example, the intersection may be calculated using a line-box intersection test for voxels depicted in Table 1 below.

TABLE 1

```
for_each_voxel_in_volume_with_high_alpha
{
    for_each_side_in_voxel
    {
        if side intersects with pick ray
        {
            if distance(this_intersection_position, camera)
            < nearest_intersection_position
            {
```

TABLE 1-continued

```
                nearest_intersection_position =
                this_intersection_position
                current_nearest_voxel = voxel
            }
        }
    }
}
```

After traversing each voxel, the spatial intersection point and the voxel indices for the nearest intersecting voxel may be found accordingly.

To enhance the perception of the position of the smart grower tool, the seismic voxels contained in the smart grower sphere (1203) may be highlighted when the mouse passes over them. This makes it easier to verify that the user is operating on the correct location. In particular, it may be easier to verify that the desired seismic features are highlighted than just looking on the position of the sphere. In addition, the highlighting enables the user to see what features behind the sphere are outside the selected seismic voxel and, thus, not affected.

A typical segmentation algorithm may use an alpha threshold value as a connectivity test. If the alpha value of a given voxel is above the threshold, the algorithm considers this as connected and may subsequently extend the geobody to encompass this voxel. In one example, the smart grower sphere (1203) may implement a local segmentation algorithm within the sphere that takes the voxels as input and outputs a segmented subset. In another example, the smart grower sphere (1203) may contain a threshold modifying algorithm that controls a global segmentation algorithm by modifying the threshold. The smart grower sphere (1203) may be associated with a gradient such that the effective alpha threshold is lower at the center of the sphere and gradually increases outwards. This example function is analogous to emulating a "softness" feature in a paint brush or spray painting in physical world.

FIG. 13 shows the soft grower sphere (1301) with softness feature. The soft grower sphere (1301) in the 3D scene (1302) may be similar to the soft grower sphere (1203) in the 3D scene (1200). As shown in FIG. 12, the voxel highlighting is brighter in the center of the sphere, where the effective threshold is the lowest.

As an example, the alpha threshold at a given distance from the center of the sphere is $$\alpha_d = \alpha_c \cdot \left(1 - f \cdot \frac{r_d}{r}\right) \quad \text{(Equation 1)}$$

where $\alpha_c$ is the alpha threshold in the center and $r_d$ is the distance from the center.

The alpha factor f is defined as $$f = \left(1 - \frac{\alpha_e}{\alpha_c}\right) \quad \text{(Equation 2)}$$

where $\alpha_e$ is the alpha threshold at the edge.

In many 2D image manipulation applications (for example, Adobe Photoshop® (registered trademark of Adobe Systems Incorporated)) there is a "spray can" feature where the user "sprays" pixels on the image. The longer the user "sprays" in one area, the brighter or more saturated the area become. The amount of spray paint applied is usually a function of either time or mouse drag. A similar approach may be useful in a segmentation context. Rather than increasing the brightness or saturation of the pixels however, the segmentation alpha threshold becomes lower as the user is applying more spray paint. Thus, the spray paint is dependent on the data display values themselves, as well as the control of the user. For example, if the user applies a little spray paint in an area, the voxels with the highest alpha are segmented. If the user applies more spray paint in the area, semitransparent voxels are also segmented.

One example of apply the "spray paint" is to use a mouse drag event such that the alpha threshold is decreased as the mouse is moved away from the mouse-pressed location. The relative amount of spray within the sphere is defined as $$\Delta a = s \cdot \sqrt{\Delta x_m^2 + \Delta y_m^2}$$ (Equation 3)

where $\Delta x_m$ and $\Delta y_m$ are the changes in mouse x and y pixel coordinates, respectively, while dragging the mouse with the left mouse button pressed; s is a user-defined sensitivity defining how sensitive the spray amount is to mouse movements.

Another example is to use mouse-press time to lower the alpha threshold. The pressure may also be defined as $$a = s \cdot (t - t_0)$$ (Equation 4)

when the user wants a time-dependent spray. t is the current time in seconds and $t_0$ is the time when the user started to press the mouse button.

The resulting alpha threshold values are given in both cases as below:

$$\alpha = \frac{\alpha_0}{1 + a}$$ (Equation 5)

where "$\alpha_0$" is the initial alpha threshold and "a" is the amount as defined above.

The spray can feature may also be combined with the softness feature described above. The user may then use the softness setting to determine how voxels will grow. Spraying with a very soft function segments voxels with emphasis on voxel alpha value before location. Hard functions grow voxels in the center of the sphere and reducing the importance of alpha values inversely as the distance from the center increases.

Figure 14:
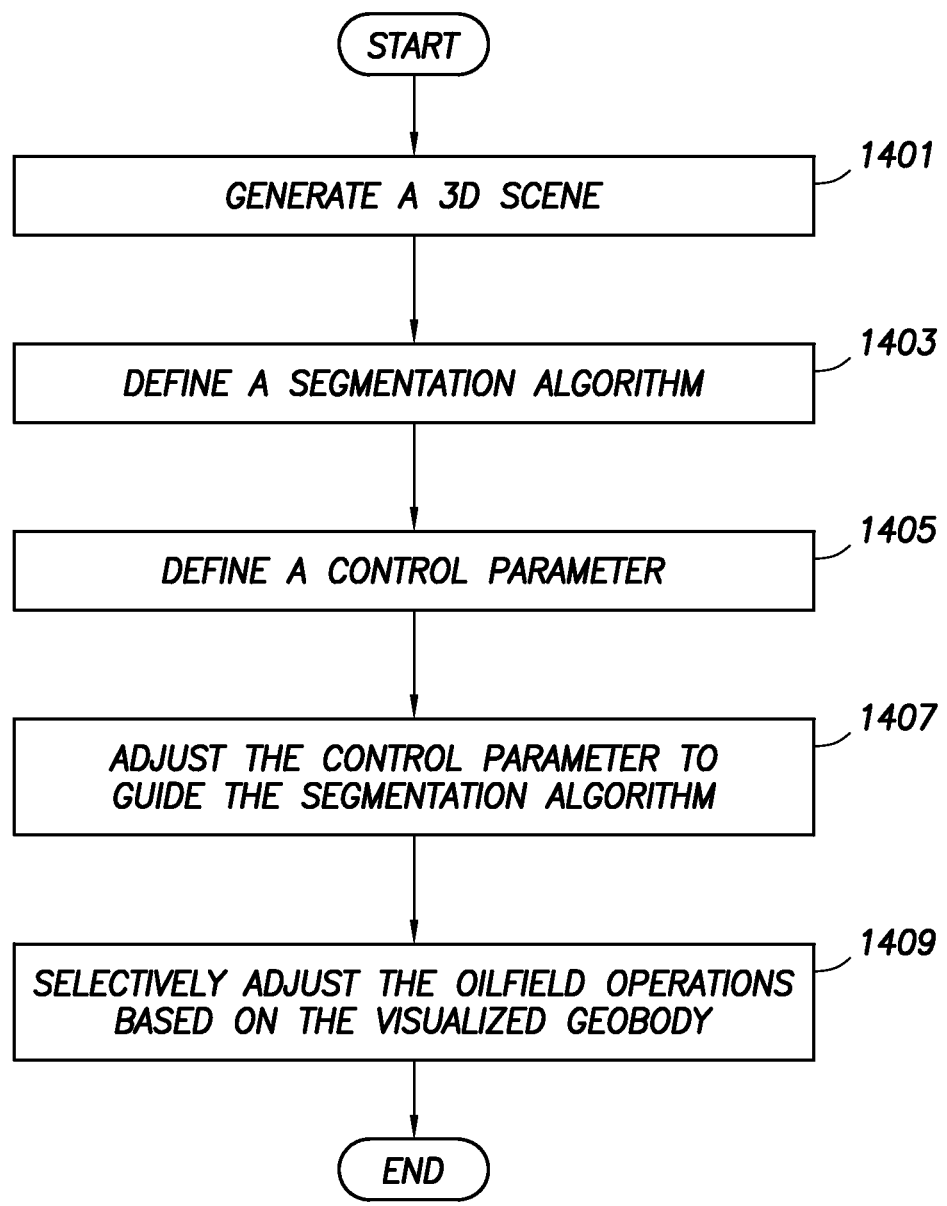
FIG. 14 shows a flow chart of a method for guiding the segmentation of a 3D volume data set.

FIG. 14 shows a flow chart of a method for guiding the segmentation of a 3D volume data set. In one or more embodiments, one or more of the elements shown in FIG. 14 may be omitted, repeated, and/or performed in a different order. Accordingly, embodiments should not be considered limited to the specific arrangement of elements shown in FIG. 14.

Initially, a 3D scene is generated (Element 1401), which includes seismic voxels for representing a volume data set of seismic data collected from the oilfield (e.g., the oilfield (100)). A segmentation algorithm for seismic interpretation may be defined (Element 1403). The segmentation algorithm may be executed to segment the volume data within the 3D scene by comparing a pre-determined threshold to an attribute of a voxel. For example, a seed may be connected to neighboring voxels by the segmentation algorithm to grow into a geobody if the seismic attribute values of the neighboring voxels are above, below, or within a range to the pre-determined threshold.

In addition, a control parameter associated with the attribute may be defined for controlling the segmentation algorithm, for example to allow user interaction in the segmentation process (Element 1405). In other example, the control parameter may be adjusted automatically based on machine learning procedures. For example, a count may be incremented for each visualized geobody generated from the segmentation process. The count may be compared to a target count determined by the user. If the count does not meet the target criteria, the attribute or the control parameter may be adjusted automatically for another iteration of segmentation process until the target count is met.

In either example, the control parameter may be adjusted to increase the pre-determined threshold, decrease the pre-determined threshold, or any combination thereof for guiding the segmentation algorithm in segmenting the volume data set to generate a visualized geobody (Element 1407). The control parameter may also be defined to vary in time in segmenting the volume data set.

In a further example, the control parameter may be defined by positioning a 3D object at multiple locations within the 3D scene. The 3D object may be associated with a threshold modifying algorithm for controlling the segmentation algorithm within a portion of the 3D scene overlapped by the 3D object. The threshold modifying algorithm may modify the pre-determined threshold based on a spatial parameter (e.g., distance from a center) within the 3D object. The positioning of the 3D object may be based on manipulating a user pointing device for positioning and dragging the 3D object to emulate a spray painting action. The oilfield operations may be selectively adjusted based on the visualized geobody in the seismic interpretation results (Element 1409).

Those skilled in the art will appreciate that although the examples provided above are described using 3D volume data sets and 3D displays, one skilled in the art will appreciate that the visualizing region growing in 3D voxel volumes may be practiced with data sets and displays having different dimensions, such as 2D data sets and 2D displays, or the like.

It will be understood from the foregoing description that various modifications and changes may be made in embodiments of the visualizing region growing in 3D voxel volumes without departing from its true spirit. For example, the method may be performed in a different sequence, the components provided may be integrated or separate, the devices included herein may be manually and/or automatically activated to perform the desired operation. The activation may be performed as desired and/or based on data generated, conditions detected and/or analysis of results from downhole operations.

A computer readable medium can embody instructions executable by a computer, for example, where the instructions provide for automatically adjusting at least one selected from a group consisting of an attribute and a control parameter while visualizing region growing in three dimensional(3D) voxel volumes. in such an example, the instructions may provide functionality for: generating a 3D scene having a plurality of voxels for representing a volume data set of seismic data collected from the oilfield; defining a segmentation algorithm for segmenting the volume data within the 3D scene, the segmentation algorithm comparing a pre-determined threshold to the attribute of a voxel of the plurality of voxels; defining the control parameter associated with the attribute, the control parameter modifying the pre-determined threshold for controlling the segmentation algorithm; adjusting the control parameter to guide the segmentation algorithm in segmenting the volume data set to generate a visualized geobody; displaying the visualized geobody; incrementing a count based on generating the visualized geobody; comparing the count to a target count to generate a comparison result; and automatically adjusting at least one selected from a group consisting of the attribute and the control parameter based on the comparison result. In such an example, the control parameter may be defined by positioning a 3D object at a plurality of locations within the 3D scene, the 3D object being associated with a threshold modifying algorithm for controlling the segmentation algorithm within a portion of the 3D scene overlapped by the 3D object; and instructions may provide functionality for: dragging the 3D object about the plurality of locations, where the 3D object is positioned and dragged by a user, where the threshold modifying algorithm is based on manipulating a user pointing device for positioning and dragging the 3D object to emulate a spray painting action.

This description is intended for purposes of illustration and should not be construed in a limiting sense. The scope of this visualizing region growing in 3D voxel volumes should be determined by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A method comprising:
providing voxels that comprise spatially distributed values for a first attribute representing characteristics of a subterranean formation and spatially distributed values for a second attribute representing characteristics of the subterranean formation wherein the first attribute and the second attribute comprise different attributes;
setting a first control parameter to provide a first weight to weigh a threshold or to weigh values of the first attribute and setting a second control parameter to provide a second weight to weigh a threshold or to weigh values of the second attribute;
from an initial seed of one or more of the provided voxels, iteratively selecting spatially connected voxels through a voxel selection criterion to generate an iteratively growing volume wherein the selecting applies the first and the second weights to comparisons between values and thresholds of the first and second attributes;
rendering a visualization of the iteratively growing volume of spatially connected voxels to a display;
halting the iteratively selecting to provide an iteratively grown volume of spatially connected voxels;
adjusting at least one of the first control parameter and the second control parameter to provide at least one adjusted weight;
from the generated iteratively grown volume of spatially connected voxels, iteratively de-selecting spatially connected voxels through a voxel de-selection criterion to generate an iteratively shrinking volume wherein the de-selecting applies the at least one adjusted weight to comparisons between values and thresholds of the first and second attributes; and
rendering a visualization of the iteratively shrinking volume of spatially connected voxels to the display.

2. The method of claim 1 further comprising rendering to the display a graphical control for setting the first control parameter and the second control parameter.

3. The method of claim 1 wherein the setting the first control parameter provides a positive weight and setting the second control parameter provides a weight implemented for selection of spatially connected voxels.

4. The method of claim 1 wherein the adjusting at least one of the first control parameter and the second control parameter provides for at least one weight implemented for de-selection of spatially connected voxels.

5. The method of claim 1 wherein at least one of the first control parameter and the second control parameter varies with respect to time as defined by a time scale over which the iteratively selecting and the iteratively de-selecting occur.

6. The method of claim 5 wherein the adjusting occurs responsive to time.

7. The method of claim 1 wherein the iteratively de-selecting identifies connected components within the iteratively grown volume of spatially connected voxels.

8. The method of claim 1 wherein the providing voxels comprises providing spatially distributed values for a third attribute representing characteristics of the subterranean formation and wherein the setting comprises setting a third control parameter to provide a third weight to weigh a threshold or to weigh values of the third attribute.

9. The method of claim 1 wherein the adjusting occurs automatically.

10. The method of claim 1 wherein the adjusting occurs responsive to positioning of an object with respect to a rendered visualization of the iteratively growing volume of spatially connected voxels or the iteratively grown volume of spatially connected voxels.

11. The method of claim 10 wherein the object comprises a paint object selected from a group consisting of a spray paint object and a paint brush object.

12. The method of claim 11 wherein the paint object comprises a paint brush object that comprises controls for at least one member selected from a group consisting of brush volume, brush softness, and time-dependent saturation.

13. The method of claim 1 wherein at least one of the first attribute or the second attribute comprises a seismic attribute.

14. One or more non-transitory computer-readable storage media comprising computer-executable instructions to instruct a computing device to:
access voxels that comprise spatially distributed values for a first attribute representing characteristics of a subterranean formation and spatially distributed values for a second attribute representing characteristics of the subterranean formation wherein the first attribute and the second attribute comprise different attributes;
render a graphical control to a display for setting a first control parameter to provide a first weight that comprises a negative weight, a neutral weight or a positive weight to weigh a threshold or to weigh values of the first attribute and setting a second control parameter to provide a second weight that comprises a negative weight, a neutral weight or a positive weight to weigh a threshold or to weigh values of the second attribute;
from one or more of the provided voxels, iteratively select spatially connected voxels through a voxel selection criterion that applies set first and second weights to comparisons between values and thresholds of the first and second attributes to thereby generate an iteratively growing volume;
from a set of the provided voxels, iteratively de-select spatially connected voxels through a voxel de-selection criterion that applies set first and second weights to comparisons between values and thresholds of the first and second attributes to thereby generate an iteratively shrinking volume; and
render a visualization of a set of voxels to the display.

15. The one or more non-transitory computer-readable storage media of claim 14 further comprising computer-executable instructions to instruct a computing device to automatically adjust at least one of the first control parameter and the second control parameter.

16. The one or more non-transitory computer-readable storage media of claim 14 comprising computer-executable instructions to instruct a computing device to adjust at least one of the first control parameter and the second control parameter responsive to position of an object with respect to a rendered visualization of a set of voxels to the display.

17. The one or more non-transitory computer-readable storage media of claim 16 comprising computer-executable instructions to position the object.

18. The one or more non-transitory computer-readable storage media of claim 17 wherein the object comprises a paint object selected from a group consisting of a spray paint object and a paint brush object.

19. The one or more non-transitory computer-readable storage media of claim 18 wherein the paint object comprises a paint brush object and wherein the instructions comprise instructions to control at least one member selected from a group consisting of brush volume, brush softness, and time-dependent saturation.

20. A system comprising:
 a processor;
 memory; and
 processor-executable instructions stored in the memory to instruct the system to:
 access voxels that comprise spatially distributed values for a first attribute representing characteristics of a subterranean formation and spatially distributed values for a second attribute representing characteristics of the subterranean formation wherein the first attribute and the second attribute comprise different attributes;
 render a graphical control to a display for setting a first control parameter to provide a first weight that comprises a negative weight, a neutral weight or a positive weight to weigh a threshold or to weigh values of the first attribute and setting a second control parameter to provide a second weight that comprises a negative weight, a neutral weight or a positive weight to weigh a threshold or to weigh values of the second attribute;
 from one or more of the provided voxels, iteratively select spatially connected voxels through a voxel selection criterion that applies set first and second weights to comparisons between values and thresholds of the first and second attributes to thereby generate an iteratively growing volume;
 from a set of the provided voxels, iteratively de-select spatially connected voxels through a voxel de-selection criterion that applies set first and second weights to comparisons between values and thresholds of the first and second attributes to thereby generate an iteratively shrinking volume; and
 iteratively render a visualization of a set of voxels to the display.

* * * * *